US011915701B2

(12) United States Patent
Leidner et al.

(10) Patent No.: US 11,915,701 B2
(45) Date of Patent: Feb. 27, 2024

(54) AUTOMATIC SUMMARIZATION OF FINANCIAL EARNINGS CALL TRANSCRIPTS

(71) Applicant: REFINITIV US ORGANIZATION LLC, New York, NY (US)

(72) Inventors: Jochen Lothar Leidner, London (GB); Georgios Gkotsis, London (GB); Tim Nugent, London (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 280 days.

(21) Appl. No.: 17/070,500

(22) Filed: Oct. 14, 2020

(65) Prior Publication Data

US 2021/0043211 A1 Feb. 11, 2021

Related U.S. Application Data

(63) Continuation-in-part of application No. 16/893,146, filed on Jun. 4, 2020.

(Continued)

(51) Int. Cl.

*G10L 15/26* (2006.01)
*G06F 40/20* (2020.01)

(Continued)

(52) U.S. Cl.

CPC .............. *G10L 15/26* (2013.01); *G06F 40/20* (2020.01); *G06N 3/047* (2023.01); *G06N 3/048* (2023.01); *G06N 20/00* (2019.01); *G10L 15/16* (2013.01)

(58) Field of Classification Search

CPC ......... G10L 15/26; G10L 15/16; G06F 40/20; G06F 40/30; G06F 16/35; G06N 3/0472;

(Continued)

(56) References Cited

U.S. PATENT DOCUMENTS 11,093,560 B2 * 8/2021 Lee .......................... G06N 3/08
2004/0122656 A1 6/2004 Abir (Continued)

FOREIGN PATENT DOCUMENTS

WO 2017/096147 6/2017

OTHER PUBLICATIONS

Jacob Devlin et al., "BERT: Pre-Training of Deep Bidiractional Transformers for Language Understanding", arxiv.org, Cornell University Library, Oct. 11, 2018, 14 pages.

(Continued)

*Primary Examiner* — Michael N Opsasnick
(74) *Attorney, Agent, or Firm* — Pillsbury Winthrop Shaw Pittman, LLP

(57) ABSTRACT

Computer-readable media, systems and methods may improve automatic summarization of transcripts of financial earnings calls. For example, a system may generate segments, such as by disambiguating sentences, from a transcript to be summarized. The system may use an estimator that assesses whether or not the segment should be included in the summary. Different types of estimators may be used. For example, the estimator may be rule-based, trained based on machine-learning techniques, or trained on based on machine-learning with language modeling using natural language processing to fine-tune language models specific to financial earnings calls.

20 Claims, 12 Drawing Sheets

Related U.S. Application Data

(60) Provisional application No. 62/923,038, filed on Oct. 18, 2019, provisional application No. 62/914,754, filed on Oct. 14, 2019, provisional application No. 62/857,417, filed on Jun. 5, 2019.

(51) Int. Cl.
*G06N 3/047* (2023.01)
*G06N 3/048* (2023.01)
*G06N 20/00* (2019.01)
*G10L 15/16* (2006.01)

(58) Field of Classification Search
CPC .... G06N 3/0481; G06N 20/00; G06N 3/0454; G06N 7/005; G06N 5/003
See application file for complete search history.

(56) References Cited

U.S. PATENT DOCUMENTS

| | | | | |
|---|---|---|---|---|
| 2011/0137636 | A1* | 6/2011 | Srihari | G06F 40/53 704/2 |
| 2016/0012818 | A1* | 1/2016 | Faizakof | G10L 15/063 704/245 |
| 2016/0247061 | A1 | 8/2016 | Trask et al. | |
| 2017/0161372 | A1* | 6/2017 | Fernández | G06F 40/211 |
| 2017/0286869 | A1 | 10/2017 | Zarosim et al. | |
| 2017/0364587 | A1* | 12/2017 | Krishnamurthy | G06F 16/345 |
| 2018/0061408 | A1* | 3/2018 | Andreas | G10L 15/22 |
| 2018/0090128 | A1* | 3/2018 | Kurata | G06F 40/20 |
| 2018/0314689 | A1 | 11/2018 | Wang et al. | |
| 2018/0366013 | A1* | 12/2018 | Arvindam | G06F 40/237 |
| 2019/0043486 | A1* | 2/2019 | Salloum | G06F 40/284 |
| 2019/0129942 | A1* | 5/2019 | Seuss | G06F 40/56 |
| 2019/0188276 | A1 | 6/2019 | Anerousis et al. | |
| 2019/0287012 | A1* | 9/2019 | Celikyilmaz | G06F 16/345 |
| 2019/0333078 | A1* | 10/2019 | Bala | G06Q 30/0201 |
| 2019/0349321 | A1* | 11/2019 | Cai | G06N 3/006 |
| 2020/0034922 | A1* | 1/2020 | Wolfe, Jr. | G06Q 10/10 |
| 2020/0111023 | A1 | 4/2020 | Pondicherry Murugapan et al. | |
| 2020/0272864 | A1* | 8/2020 | Faust | G06V 10/764 |
| 2020/0279017 | A1* | 9/2020 | Norton | G06F 16/36 |
| 2020/0327151 | A1 | 10/2020 | Coquard et al. | |
| 2020/0334520 | A1 | 10/2020 | Chen et al. | |
| 2022/0198272 | A1 | 6/2022 | Liu et al. | |

OTHER PUBLICATIONS

“International Search Report and written opinion, PCT Application No. PCT/IB2020/055261 filed date Jun. 4, 2020”, dated Aug. 28, 2020, 11 pages.

N. G. Polson. Convergence of Markov chain monte carlo algorithms. In J. M. Bernardo, J. O. Berger, A. P. Dawid, and A. F. M. Smith, editors, Bayesian Statistics 5—Proceedings of the Fifth Valencia International Meeting, pp. 297-321, 1996.

Dogu Araci. Fin BERT: Financial sentiment analysis with pre-trained language models. arXiv preprint arXiv:1908. 10063, 2019, 11 pages.

Bjorn Barz and Joachim Denzler. Deep learning on small datasets without pre-training using cosine loss. In IEEE Winter Conference on Applications of Computer Vision, VVACV 2020. IEEE, 2020,—10 pages.

Iz Beltagy, Kyle Lo, and Arman Cohan. SciBERT: A preirained language model for scientific text. In Proceedings of the 2019 Conference on Empirical Methods in Natural Language Processing and the 9th International Joint Conference on Natural Language Processing (EMNLP-iJCNLP), pp. 3606-3611, 2019.

Marcus D. Bloice, Christof Stocker, and 1\ndreas Holzinger. Augmentor: An image augmentation library for machine learning. Technical report , ArXiv preprint server, 2017, 5 pages.

Yoonjung Choi. Yuchul ,Jung, and Sung-Hyon Myaeng. Identifying controversial issues and their sub-topics in news articles. In Proceedings of the 2010 Pacific Asia Conference on Intelligence and Security Informatics, PAISI’10, pages 140-153, Berlin, Heidelberg, 2010. Springer.

Vinicio Desola, Kevin Hanna, and Pri Nonis. Fin BERT: pre-trained model on sec: filings for financial natural language tasks. Technical report, University of California at Berkeley, 2019. 11 pages.

Jacob Devlin, Ming-Wei Chang, Kenton Lee, and Kristina Toutanova. Bert: Pre-training of deep bidirectional transformers for language understanding. arXiv preprint arXiv: 1810.04805, 2018, 16 pages.

Shiri Dori-Hacohen, David Jensen, and James Allan. Controversy detection in Wikipedia using collective dassification. In Proceedings of the 39th International ACM SIGIR Conference on Research and Development in Information Retrieval, SIGIR ’16, pp. 797-800, New York. NY, USA, 2016 Association for Computing Machinery.

Sergey Edunov, Myle Ott, Michael Auli, and David Grangier. Understanding back-translation at scale. arXiv preprint arXiv: 1808. 09381, 2018, 12 pages.

Stefan Feuerriegel and Helmut Prendinger. News-based trading strategies. Decision Support Systems, 90:65-74, 2016, 35 pages.

Gunnar Friede, Tirno Busch, and Alexander Bassen. ESG and financial performance: aggregated evidence from more than 2000 empirical studies. Journal of Sustainable Finance & Investment, 5(4):210-233, 2015.

Soh Young In, Dane Rook, and Ashby Monk. Integrating alternative data (also known as ESG data) in investment decision making. Global Economic Review, 48(3):237-260, 2019.

Myungha Jang, John Foley, Shiri Dori-Hacohen, and James Allan. Probabilistic approaches to controversy detection In Proceedings of the 25th ACM International on Conference on Information and Knowledge Management, CIKM ’16, pp. 2069-2072, New York, NY, USA, 2016. Association for Computing Machinery.

Nikita Kitaev, tukasz Kaiser, and Anselm Levskaya. Reformer: The efficient transformer. arXiv preprint arXiv:2001.04451, 202.0, 12 pages.

Olga Kovaleva, Alexey Romanov, Anna Rogers, and Anna Rumshisky. Revealing the dark secrets of BERT. arXiv preprint arXiv:1908. 08593, 2019, 10 pages.

Zhenzhong Lan, Mingda Chen, Sebastian Goodman, Kevin Gimpel, Piyush Sharma, and Radu Soricut. Albert: A lite BERT for self-supervised learning of language representations. arXiv preprint arXiv:1909.11942, 2019, 17 pages.

Jinhyuk Lee, Wonjin Yoon, Sungdong Kim, Donghyeon Kim, Sunkyu Kim, Chan Ho So, and Jaewoo Kang. BioBERT: pre-trained biomedical language representation model for biomedical text mining. arXiv preprint arXiv:1901.08746, 2019, 7 pages.

Yonglong Lu, Nebojsa Nakicenovic, Martin Visbeck, and Anne-Sophie Stevance. Policy: Five priorities for the UN Sustainable Development Goals. Nature News, 520(7548):432, 2015.

X.-L Meng and D. A van Dyk. Seeking efficient data augmentation schemes via conditional and marginal augmentation. Biornetrika, 86(2):301-320, 1999.

Tim Nugent, Fabio Petroni, Natraj Raman, Lucas Carstens, and Jochen L Leidner. A comparison of classification models for natural disaster and critical event detection from news. In 2017 IEEE International Conference on Big Data {Big Data), pp. 3750-3759. IEEE. 2017.

Willem Schramade. Investing in the UN sustainable development goals: Opportunities for companies and investors. Journal of Applied Corporate Finance, 29(2):87-99, 2017.

Rico Sennrich, Barry Haddow, and Alexandra Birch. Improving neural machine translation models with monolingual data. arXiv preprint arXiv:1 511.06709, 2015, 11 pages.

Ashish Vaswani; Samy Bengio; Eugene Brevdo; Francois Chollet, Aidan N. Gomez, Stephan Gouws; Uion Jones, tukasz Kaiser, Nal Kalchbrenner, Niki Parmar, Ryan Sepassi, Noam Shazeer, and Jakob Uszkoreit. Tensor2Tensor for neural niachine translation. Co RR, absi1803.07416, 2018. 9 pages.

(56) References Cited

OTHER PUBLICATIONS

Yonghui Wu, Mike Schuster, Zhifeng Chen, Quoc V Le, Mohammad Norouzi, Wolfgang Macherey, Maxim Krikur:, Yuan Cao, Qin Gao, Klaus Macherey, et al. Google's neural machine translation system: Bridging the gap between human and machine translation. arXiv preprint arXiv:1609.08144, 2016. 23 pages.
Qizhe Xie, Zihang Dai, Eduard Hovy, Minh-Thang Luong, and Quoc V Le. Unsupervised data augmentation. arXiv preprint arXiv: 1904.12848, 2019, 19 pages.
Adams Wei Yu, David Dohan, Minh-Thang Luong, Rui Zhao, Kai Chen, Mohammad Norouzi, and QuocV Le. Oanet: Combining local convolution with global self-attention for reading comprehension. arXiv preprint arXiv:1804.09541, 2018, 24 pages.
Yukun Zhu, Ryan Kiros, Rich Zemel. Ruslan Salakhutdinov, Raquel Urtasun, Antonio Torralba, and Sanja Fidler. Aligning books and movies: Towards storylike visual explanations by watching movies and reading books. In Proceedings of the IEEE International Conference on Computer Vision, pp. 19-27, 2015.
Mandeep Kaur et al., "Supervised Machine Learning for Extractive Query Based Summarisation of Biomedical Data", arxiv.org, Sep. 14, 2018.
Vishal Juneja et al., "A learning-based sampling approach to extractive summarization", Jun. 2, 2010, pp. 34-39.
Ferreira Rafael et al., "Assessing sentence scoring techniques for extractive text summarization", Expert Systems with Applications, Oxford, GB, vol. 40, No. 14, May 3, 2013, pp. 5755-5764.
European Patent Office, "International Search Report and Written Opinion, PCT Application No. PCT/IB2020/059623 filed Oct. 14, 2020", dated Jan. 12, 2021, 18 pages.
Iz Beltagy, Kyle Lo, and Arman Cohan. 2019. SciBERT: A pretrained language model for scientific text. In Proceedings of the 2019 Conference on Empirical Methods in Natural Language Processing and the 9th International Joint Conference on Natural Language Processing (EMNLP-IJCNLP), pp. 3615-3620, Hong Kong, China. Association for Computational Linguistics.
Taylor Berg-Kirkpatrick, Dan Gillick, and Dan Klein. 2011. Jointly learning to extract and compress. In Proceedings of the 49th Annual Meeting of the Association for Computational Linguistics: Human Language Technologies, pp. 481-490, Portland, Oregon, USA, June. Association for Computational Linguistics.
Mohammad Hadi Bokaei, Hossein Sameti, and Yang Liu. 2016. Extractive summarization of multi-party meetings through discourse segmentation. Natural Language Engineering, 22(1):41-72.
Sergey Brin and Lawrence Page. 1998. The anatomy of a large-scale hypertextual Web search engine. Computer Networks and ISDN Systems, 30(1-7):107-117, April.
Anne Hendrik Buist, Wessel Kraaij, and Stephan Raaijmakers. 2004. Automatic summarization of meeting data: a feasibility study. In Proceedings of the Conference on Computational Linguistics in the Netherlands),, CLIN, pp. 45-57.
Eddy Cardinaels, Stephan Hollander, and Brian J. White. 2019. Automatic summarization of earnings releases: attributes and effects on investors' judgments. Review of Accounting Studies, 24:860-890.
Giuseppe Carenini, Gabriel Murray, and Raymond Ng. 2011. Methods for Mining and Summarizing Text Conversations. No. 17 in Synthesis Lectures on Data Management. Morgan Claypool, San Rafael, CA, USA, 132 pages.
Belinda Crawford Camiciottoli. 2010. Earnings calls: Exploring an emerging financial reporting genre. Discourse & Communication, 4(4):343-359.
Jacob Devlin, Ming-Wei Chang, Kenton Lee, and Kristina Toutanova. 2019. BERT: Pre-training of deep bidirectional transformers for language understanding. In Proceedings of the 2019 Conference of the North American Chapter of the Association for Computational Linguistics: Human Language Technologies, vol. 1, pp. 4171-4186, Minneapolis, MN, USA.
Mahmoud El-Haj, editor. 2020, forthcoming. The 1st Joint Workshop on Financial Narrative Processing and MultiLing Financial Summarisation (FNP-FNS 2020) held at The 28th International Conference on Computational Linguistics (COLING'2020), Barcelona, Spain on Sep. 13, 2020, 2 pages.
Katja Filippova, Mihai Surdeanu, Massimiliano Ciaramita, and Hugo Zaragoza. 2009. Company-oriented extractive summarization of financial news. In Proceedings of the 12th Conference of the European Chapter of the ACL, EACL 2009, pp. 246-254, Athens, Greece. ACL.
Dan Gillick and Yang Liu. 2010. Non-expert evaluation of summarization systems is risky. In Proceedings of the NAACL HLT 2010 Workshop on Creating Speech and Language Data with Amazon's Mechanical Turk, pp. 148-151, Los Angeles, June. Association for Computational Linguistics.
Dan Gillick, Korbinian Riedhammer, Benoit Favre, and Dilek Hakkani-Tur. 2009. A global optimization framework for meeting summarization. In Proceedings of the 2009 IEEE International Conference on Acoustics, Speech and Signal Processing, ICASSP '09, pp. 4769-4772, USA. IEEE Computer Society.
Sepp Hochreiter and Jurgen Schmidhuber. 1997. Long short-term memory. Neural computation, 9(8):1735-1780.
Kal Hong, John M. Conroy, Beno/\it Favre, Alex Kulesza, Hui Lin, and Ani Nenkova. 2014. A repository of state of the art and competitive baseline summaries for generic news summarization. In Proceedings of the 9th International Conference on Language Resources and Evaluation, Reykjavik, Iceland, May 26-31, 2014, LREC 2014, pp. 1608-1616.
C. J. Hutton and Eric Gilbert. 2014. VADER: A parsimonious rule-based model for sentiment analysis of social media text. In Eighth International AAAI Conference on Weblogs and Social Media, ICWSM, pp. 216-225.
Masaru Isonuma, Toru Fujino, Junichiro Mori, Yutaka Matsuo, and Ichiro Sakata. 2017. Extractive summarization using multi-task learning with document classification. In Proceedings of the 2017 Conference on Empirical Methods in Natural Language Processing, pp. 2101-2110, Copenhagen, Denmark. Association for Computational Linguistics.
Katherine A. Keith and Amanda Stent. 2019. Modeling financial analysts' decision making via the pragmatics and semantics of earnings calls. In Anna Korhonen, David R. Traum, and Llu'isM'arquez, editors, Proceedings of the 57th Conference of the Association for Computational Linguistics, ACL 2019, Florence, Italy, Jul. 28-Aug. 2, 2019, vol. 1, pp. 493-503. ACL.
Zhang Xinyi and Lihul Chen. 2019. Capsule graph neural network. In International Conference on Learning Representations, New Orleans, LA, USA, May 6-9, 2019, ICLR 2019, 16 pages.
Klaus K. Krippendorff. 2013. Content Analysis: An Introduction to its Methodology. Sage Publications, Beverly Hills, CA, USA, 2nd edition.
David F. Larcker and Anastasia A. Zakolyukina. 2012. Detecting deceptive discussions in conference calls. Journal of Accounting Research, 50(2):495-540.
Jinhyuk Lee, Wonjin Yoon, Sungdong Kim, Donghyeon Kim, Sunkyu Kim, Chan Ho So, and Jaewoo Kang. 2019. BioBERT: a pre-trained biomedical language representation model for biomedical text mining. Bioinformatics, 36(4):1234-1240, 09.
Jochen L. Leidner and Frank Schilder. 2010. Hunting for the Black Swan: risk mining from text. In Proceedings of the ACL 2010 System Demonstrations, pp. 54-59, Uppsala, Sweden. Association for Computational Linguistics.
Jochen L. Leidner. 2019. Summarization in the financial and regulatory domain. In Alessandro Fiori, editor, Trends and Applications of Text Summarization Techniques, chapter 7. IGI Global, Hershey, PA, USA.
Yang Liu and Mirella Lapata. 2019. Text summarization with pretrained encoders. In Proceedings of the 2019 Conference on Empirical Methods in Natural Language Processing and the 9th International Joint Conference on Natural Language Processing (EMNLP-IJCNLP), pp. 3728-3738, Hong Kong, China. Association for Computational Linguistics.
Yang Liu. 2019. Fine-tune BERT for extractive summarization. ArXiv pre-print cs.CL/1903.10318.
H. P. Luhn. 1958. The Automatic Creation of Literature Abstracts. IBM Journal of Research Development, 2(2):159-165.

(56) References Cited

OTHER PUBLICATIONS

Inderjeet Mani and Eric Bloedorn. 2000. Summarizing Similarities and Differences Among Related Documents. Information Retrieval, 1(1), 23 pages.
Bao-Z. Sanderson M. Yuan, C. and Yong Tang. "Incorporating word attention with convolutional neural networks for abstractive summarization". Published online on Aug. 6, 2019. World Wide Web, 23:267-287.
Ramesh Nallapati, Bowen Zhou, and Mingbo Ma. 2016. Classify or select: neural architectures for extractive document summarization. ArXiv preprint cs.CL/1903.10318 (cited Jan. 2, 2020 abs/1611.04244, ArXiv preprint server.
Ramesh Nallapati, Feifei Zhai, and Bowen Zhou. 2017. Summarunner: A recurrent neural network based sequence model for extractive summarization of documents. In AAAI Conference on Artificial Intelligence.
Ani Nenkova and Kathleen McKeown. 2011. Automatic Summarization, vol. 5 of Foundations and Trends in Information Retrieval. Now, Delft, The Netherlands.
Ani Nenkova and Rebecca Passonneau. 2004. Evaluating content selection in summarization: The Pyramid method. In Daniel Marcu Susan Dumais and Salim Roukos, editors, Proceedings of HLT-NAACL, pp. 145-152, Boston, MA, USA. Association for Computational Linguistics.
Xipeng Qiu, Tianxiang Sun, Yige Xu, Yunfan Shao, Ning Dai, and Xuanjing Huang. 2020. Pre-trained Models for Natural Language Processing: A Survey. arXiv e-prints, p. arXiv:2003.08271, March.
Evan Sandhaus. 2008. The New York Times annotated corpus. Linguistic Data Consortium, Philadelphia, 6(12):e26752.
Abigail See, Peter J. Liu, and Christopher D. Manning. 2017. Get to the point: summarization with pointergenerator networks. In Proceedings of the 55th Annual Meeting of the Association for Computational Linguistics, vol. 1 of ACL 2017, pp. 1073-1083. Association for Computational Linguistics.
R. Sureka and H. P. H. Kong. 2006. Automated trainable summarizer for financial documents. In 2006 10th IEEE International Enterprise Distributed Object Computing Conference Workshops (EDOCW'06), 4 pages.
Juan-Manuel Torres-Moreno. 2014. Automatic Text Summarization. Cognitive Science and Knowledge Management Series. Wiley, Hoboken, NJ, USA.
Lu Wang and Claire Cardie. 2013. Domain-independent abstract generation for focused meeting summarization. In Proceedings of the 51st Annual Meeting of the Association for Computational Linguistics (vol. 1: Long Papers), pp. 1395-1405, Sofia, Bulgaria, August. Association for Computational Linguistics.
William Yang Wang and Zhenhao Hua. 2014. A semiparametric Gaussian copula regression model for predicting financial risks from earnings calls. In Proceedings of the 52nd Annual Meeting of the Association for Computational Linguistics (vol. 1: Long Papers), pp. 1155-1165, Baltimore, MD, USA. ACL.
Office Action issued in related U.S. Appl. No. 16/893,146, dated Mar. 21, 2023.
Office Action issued in related U.S. Appl. No. 16/893,146, dated Jun. 30, 2023.

* cited by examiner $$
\begin{aligned}
S &\longrightarrow Duolog\, Q\&A \\
Duolog &\longrightarrow Operator \\
&\quad\; CEO\, CFO\, (CEO \mid CFO)+ \\
Q\&A &\longrightarrow (Operator\, ((Analyst)+ \\
&\quad\; (CEO \mid CFO))+)+
\end{aligned}
$$

FIG. 9C

AUTOMATIC SUMMARIZATION OF FINANCIAL EARNINGS CALL TRANSCRIPTS

RELATED APPLICATIONS

This application claims priority to U.S. Provisional Patent Application No. 62/914,754, filed on Oct. 14, 2019, and U.S. Provisional Patent Application No. 62/923,038, filed on Oct. 18, 2019, the contents of both of which are incorporated by reference in their entireties herein. This application is a continuation-in-part of U.S. patent application Ser. No. 16/893,146, filed Jun. 4, 2020, which claims priority to U.S. Provisional Patent Application No. 62/857,417, filed on Jun. 5, 2019, entitled "METHOD AND APPARATUS FOR CONTROVERSY CLASSIFICATION," the content of both of which are incorporated by reference in their entireties herein.

BACKGROUND

Summarization of documents such as transcripts of financial earnings call or other speech transcripts may be important to various parties such as analysts and investors. However, computationally generating summaries of such transcripts may be difficult due to the type of language used in earnings calls and inability for the computer to identify parts of the call or other speech that are important enough to include in a summary.

SUMMARY

The disclosure relates to computer-readable media, systems and methods that improve automatic summarization of transcripts of spoken words or phrases based on estimators that are rule-based, trained based on machine-learning techniques, or use neural transformer-based natural language processing. For example, a system may generate a plurality of segments based on a transcript to be summarized. The segments may include sentences or other portions disambiguated from the transcript. The system may use an estimator to analyze each segment to generate a segment score for each segment. The segment score may indicate whether or not the segment is relevant to the transcript. A segment that is relevant to the transcript may refer to a segment that is to be included in a summary of the transcript. The estimator may include a rule-based estimator that applies a set of heuristic rules, a machine-learning estimator trained to learn relationships among features of transcripts to labeled segments deemed to be relevant, and/or a machine-learning estimator trained to learn language models that are tuned to determine the relevance of segments.

The particular value and manner of generating a segment score may depend on the type of estimator used to generate the segment score. For example, a rule-based estimator may generate an integer or other value that is incremented or decremented based on an evaluation of each rule and feature against the segment. The rule-based estimator may be used when training, validation, and/or annotation (labeled) data is unavailable. Thus, a rule-based estimator may be rapidly deployed while still providing improved automatic summary generation.

When data is available, a machine-learning approach may be able to learn from training data to generate a model that fits the training data. The machine-learning estimators may implement the model to determine the relevance of a given segment of a transcript to be summarized. To facilitate such machine-learning, the system may generate and store a gold standard corpus. The gold standard corpus may include segments of transcripts annotated by subject matter experts (referred to as annotators). For example, the system may collect a relevance vote from each annotator regarding each segment of a transcript from an annotation corpus. A relevance vote may indicate the annotator's determination that the segment is relevant to the transcript. The system may store, in the gold standard corpus, labeled segment data that includes data relating to a segment and its corresponding total vote count. Furthermore, the system may generate a gold standard summary that includes segments deemed by the annotators to be relevant, such as when a segment receives a simple majority or other threshold count of votes. In this manner, segments deemed to be relevant may be included in the gold standard corpus, which may be used to train a machine-learning regression estimator, a binary classification estimator, a machine-learning natural language processing estimator, and/or a pre-trained machine-learning natural language processing estimator. Once trained, each of these estimators may execute at runtime to automatically generate a determination of whether a segment is relevant to the transcript.

A machine-learning regression estimator may output a range of values indicative of whether the segment is relevant based on a decision tree generated from learned relationships between the features and labeled segment data. A binary classification estimator may output a classification of whether the segment is relevant based on learned relationships between features and labeled segments.

In some examples, machine learning techniques may be combined with natural language processing techniques to train estimators. These estimators may use neural transformer-based approaches for natural language processing on the transcripts. In some of these examples, the system may train and use machine-learning natural language processing estimators that fine-tune a general language model to generate a domain-specific language model using the gold standard corpus. For example, the domain-specific language model may be tuned to learn aspects of segments that subject matter experts deemed were relevant. The domain-specific language model may be pretrained (prior to fine-tuning) on a pre-training transcript corpus to learn language used in financial earnings calls or other types of transcribed speech reflected in the pre-training transcript corpus. For example, natural language appearing in financial earnings calls may be different than natural language appearing in other text content. As such, the general language model may be further trained on the pre-training transcript corpus and then fine-tuned using the gold standard corpus. Based on the segment scores, the system may identify a subset of the segments in the transcript and generate the summary based on the subset.

BRIEF DESCRIPTION OF THE DRAWINGS

Features of the present disclosure may be illustrated by way of example and not limited in the following Figure(s), in which like numerals indicate like elements, in which:

FIG. 9C represents shows a formal grammar for turn-taking in transcripts.

DETAILED DESCRIPTION

Figure 1:
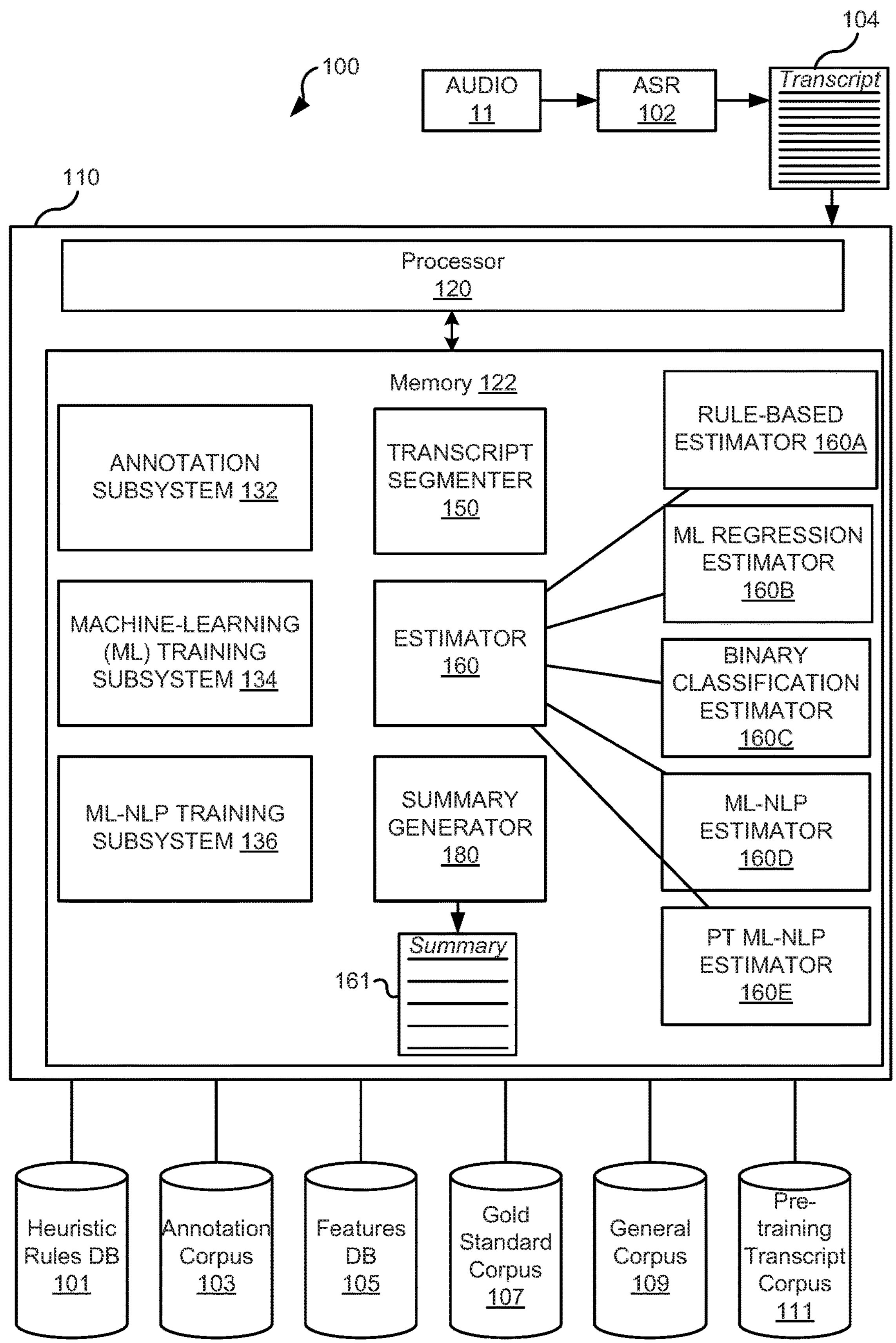
FIG. 1 illustrates an example of a system to automatically generate summaries of transcripts using rule-based or machine-learning estimators.

The disclosure herein relates to methods and systems of automatically summarizing transcripts of spoken speech, such as financial earnings calls. The term "automatically summarize" or "automatically generate a summary" and similar terms may refer to the use of computer-applied heuristic rules or estimators trained using machine-learning and/or natural language processing techniques to generate a summary of a transcript. Although examples throughout may refer to transcripts of financial earnings calls, transcripts of other types of speeches may be automatically summarized based on the disclosure herein.

Financial earnings call transcripts are important and long, such as 30-60 pages, documents. Analysts and others may rely on financial earnings call transcripts to assess the investment-worthiness of public companies on a regular basis. Earnings calls may be regular, such as quarterly or annual, pre-scheduled conference calls held between company executives and financial analysts and investors. A financial earnings call may include a spoken duolog in which two company executives, such as a chief executive office and chief financial officer, provide a presentation, followed by moderated questions from analysts to company executives, and then answers to the questions. Financial earnings call transcripts pose challenging automatic summarization by computers because they are produced from spoken language, contain redundant parts (parts that should not make it to a summary), and because of the nature of the duolog and question and answer format that may make it difficult for a computer to determine which portion of the transcript should be included in a summary.

To address these and other issues, computational approaches may be improved to analyze segments such as sentences of transcripts to determine whether a given segment should be included in the summary. Such analysis may be performed by rule-based estimators or machine-learning estimators, some of which may employ neural transformer-based approaches.

In some examples, a rule-based estimator may use features as heuristics to estimate the relevance of a given segment. The rule-based estimator may use a feature vector that includes a plurality of features, which may be human-engineered as being predictive of whether a segment is relevant. The rule-based estimator may employ a rule-based scoring mechanism that adds or subtracts points, where a tally of points for a given segment may be used as its segment score. The examples that follow may provide specific point values, but these may be changed as needed.

For example, the rule-based estimator may add one bonus point if the segment includes digit sequences and currency designators. To avoid favoring short sentences, a bonus is awarded for segments exceeding 50 characters in length. If an absolute value of sentiment polarity (such as a VADER sentiment score described herein) is greater 0.5, another point is awarded. The rule-based estimator may add one bonus point is for each financial lexicon match and each capitalized word (except at the beginning of a sentence). A "fluff" lexicon is a short list of phrases to identify boilerplate language or politeness protocol utterances used to exclude such sentences. A sentence containing a fluff phrase may be removed from a summary without substantial loss. As such, the rule-based estimator may subtract 3 points for the segment if that segment includes a fluff phrase. Examples of financial and fluff lexicons are illustrated in Table 3.

For machine-learning approaches that include the machine-learning regression estimator, the binary classification estimator, and the machine-learning natural language processing estimators, training and evaluation may use a uniform, 3-fold, document-level cross-validation.

The machine-learning regression estimator may use a regressive decision tree pruned to a maximum of eight levels to avoid overfitting. Other levels may be used according to particular needs. This model may be trained from the regression data using label values derived from the total number of relevance votes for a given segment in the training data.

The binary classification estimator may be trained based on the binary labels in the gold standard corpus. During training, standard deviation of the accuracy was less than 0.002 for the binary classification estimator and the Mean Square Error of the machine-learning regression estimator was less than 0.028. These estimators may produce an output that has 20% of the number of input segments in a given transcript, which may be in-line with the annotation task provided to the annotators to generate the gold standard corpus.

The neural language model-based approaches may include the machine-learning natural language processing estimator and the pre-trained machine-learning natural language processing estimator. The machine-learning natural language processing estimator may be based on Bidirectional Encoder Representations from Transformers (BERT), which may use large-scale pre-training and a multi-headed attention architecture to learn complex features from a general corpus of text. The BERT-base architecture, consisting of 12 transformer layers each with 12 attention heads, 768 hidden units, and a total of 110 million parameters, by adding a single linear layer. Inputs may include single segments from a transcript, and a predicted score is generated for each by passing the classification token (CLS) representation through the linear layer and a sigmoid function. The language model may be fine-tuned based on the gold standard corpus, starting with the cased version of the BERT-base checkpoint files representing the general language model. The fine-tuning training parameters may include 40 epochs using a learning rate of 1e-5, a dropout rate of 0.1, a learning rate warm-up proportion of 0.1, a batch size of 64 and a mean squared error (MSE) loss function.

The pre-trained machine-learning natural language processing estimator is a variant of the foregoing by adding pre-training on top of the BERT-base checkpoint files before fine-tuning. Pre-training may be based on a pre-training transcript corpus, an example of which included 390,000 transcripts totaling 2.9 billion tokens. The pre-training transcript corpus may be converted into a TENSORFLOW record format for BERT's masked language model (LM) and next sentence prediction loss function tasks with parameters: sequence lengths of 128 and 512 tokens with a duplication factor of 10 and masked LM probability of 0.15, although other parameters may be used. Pre-training may be executed using a batch size of 512 for 2.5 million steps at a maximum sequence length of 128 tokens, and then 500,000 steps at a maximum sequence length of 512 tokens, since the long sequences are mostly needed to learn positional embeddings which can be learned fairly quickly. The additional pre-training may result in a domain-specific version of BERT based on the pre-training transcript corpus.

FIG. 1 illustrates an example of a system 100 to automatically generate summaries 161 of transcripts 104 using rule-based or machine-learning estimators 160. The system 100 may include one or more databases (DBs) (such as a heuristic rules database 101, an annotation corpus 103, a features database 105, a gold standard corpus 107, a general corpus 109, and a pre-training transcript corpus 111), a computer system 110, and/or other components.

The heuristic rules database 101 may include a plurality of heuristic rules (hereinafter, simply, "rules") applied by the computer system 110. More particularly, the plurality of rules may be applied and evaluated by a rule-based estimator 160A to score and classify a segment of a transcript 104. A transcript 104 may be derived from automated speech recognition (ASR) 102 performed on audio 11. Audio 11 may include a financial earnings call, in which case the transcript 104 represents an automated speech-to-text recognition of the financial earnings call. In other examples, the transcript 104 may be manually dictated from the audio 11.

A rule from the heuristic rules database 101 may instruct the rule-based estimator 160A to evaluate a variable of a segment of a transcript and then assign a sub-score based on the evaluated variable. The rule-based estimator 160A may evaluate each of the rules in this manner and generate a segment score for the segment based on the resulting sub-scores.

Other estimators 160B-E may not be based on rules, but rather based on machine-learning techniques. Such machine-learning techniques may be based on an annotation corpus 103 to be annotated by subject matter experts. The annotation corpus 103 may include randomly sampled English-language documents from commercially available multi-year data-set of financial earnings call transcripts. The financial earnings call transcripts may be anonymized to remove names of companies and/or individuals. In some examples, the financial earnings call transcripts may be pre-processed to remove boilerplate text such as the presenters on the call. Table 1 illustrates an example of data relating to the annotation corpus 103.

TABLE 1

Statistics of an example of an annotation corpus 103 that may be used.

| | |
|---|---|
| Corpus text size (in word units) | 312,000 |
| Corpus text size (in MB) | 1.5 |
| Number of documents | 50 |
| Number of unique sentences (annot.) | 20463 |
| Annotations per sentence | 5 |
| Number of companies covered | 50 |

The features database 105 may include a plurality of predefined features used for machine-learning, such as to train the ML regression estimator 1606, binary classification estimator 160C, ML-NLP estimator 160D, and/or pre-trained ML-NLP estimator 160E. The features may be human-engineered. Table 2 illustrates examples of features. Although nine features are shown, other numbers and types of features may be used. It should be noted that, in some examples, the ML-NLP estimator 160D, and/or pre-trained ML-NLP estimator 160E may forego training using the predefined features as will be described herein.

TABLE 2

Predefined features for training.

| # | Feature name | Value Type | Description |
|---|---|---|---|
| f1 | DIGSEQS | Integer | number of disconnected digit sequences in a sentence |
| f2 | LENGTH | Integer | the sentence length in number of characters |
| f3 | HASPERC | Boolean | whether this sentence contains at least one "%" |
| f4 | HASCURR | Boolean | whether a currency word or symbol is present |
| f5 | SENTIM | Real | absolute value of the sentiment polarity |
| f6 | FINLEX | Integer | number of matches from financial lexicon (See Table 3) |
| f7 | CAPTOK | Integer | number of capitalized tokens |
| f8 | FLUFF | Integer | number of fluff phrases that match in the sentence (See Table 3) |
| f9 | DISTFSENT | Real | distance from the beginning of the text (in percent) |

TABLE 3

Examples of financial lexicons and fluff phrases. The following provide non-limiting examples of financial lexicons and fluff phrases.

| | | | | | | | |
|---|---|---|---|---|---|---|---|
| Financial lexicons | profit | loss | revenue | EBIT | EBITDA | Margin | EPS |
| | dividends | solvency | bankruptcy | chapter 11 | Administration | Write down | Scandal |
| | incident | earnings | fluctuation | Cash flow | Growth | Decline | Surprise |
| | breach | fine | compliance | law suit | Litigation | Guidance | Competitor |
| | debt | disruption | redundancies | efficiency | Layoffs | Reduction | demand |

TABLE 3-continued

Examples of financial lexicons and fluff phrases. The following provide non-limiting examples of financial lexicons and fluff phrases.

| | | | | | | | |
|---|---|---|---|---|---|---|---|
| Fluff phrases | Good morning | welcome to | thank you | great question | lines are | welcome ladies | operator |

The gold standard corpus 107 may include labeled data resulting from annotation of the annotation corpus 103 by subject matter experts for machine-learning. For example, the gold standard corpus 107 may include segments of transcripts from the annotation corpus 103 labeled as relevant or not by human annotators, number of votes that human annotators deemed that a given segment was relevant, and/or other annotations received from subject matter experts. An example of such annotation is further described with respect to FIG. 4.

The general corpus 109 may include unannotated text relating to non-specific subject matter. For example, the general corpus 109 may include the English language Wikipedia™ corpus of data and the BookCorpus described by Zhu et al., 2015, totaling approximately 3,300 million words.

The pre-training transcript corpus 111 may include transcripts of financial earnings calls. One example of a pre-training transcript corpus 111 may include 390,000 transcripts totaling 2.9 billion tokens. In some examples, the pre-training transcript corpus 111 may be converted into a format for use in a machine-learning environment. For example, the pre-training transcript corpus 111 may be converted into a TENSORFLOW record format for BERT's masked language model (LM) and next sentence prediction loss function tasks, at sequence lengths of 128 and 512 tokens with a duplication factor of 10 and masked LM probability of 0.15.

The computer system 110 may include a server, a computer, or the like that generates a summary 161 of a transcript 104. The computer system 110 may include a processor 120, a memory 122, and/or other components. The processor 120 may include a semiconductor-based microprocessor, a central processing unit (CPU), an application specific integrated circuit (ASIC), a field-programmable gate array (FPGA), and/or other suitable hardware device. The memory 122 may have stored thereon machine-readable instructions (which may also be termed computer readable instructions) that program the processor 120 (and therefore computer system 110) to execute various functions described herein with respect to the computer system 110. The memory 122 may be an electronic, magnetic, optical, or other physical storage device that includes or stores executable instructions. The memory 122 may be, for example, Random Access memory (RAM), an Electrically Erasable Programmable Read-Only Memory (EEPROM), a storage device, an optical disc, and the like. The memory may be a non-transitory machine-readable storage medium, where the term "non-transitory" does not encompass transitory propagating signals.

In some examples, the memory 122 may store an annotation subsystem 132, a machine-learning (ML) training subsystem 134, a machine-learning-natural language processing (ML-NLP) training subsystem 136, a transcript segmenter 150, an estimator 160, a summary generator 170, and/or other instructions. It should be noted that each of the foregoing instructions may be implemented in hardware instead of, or in addition to, instructions that program the processor 120.

Figure 4:
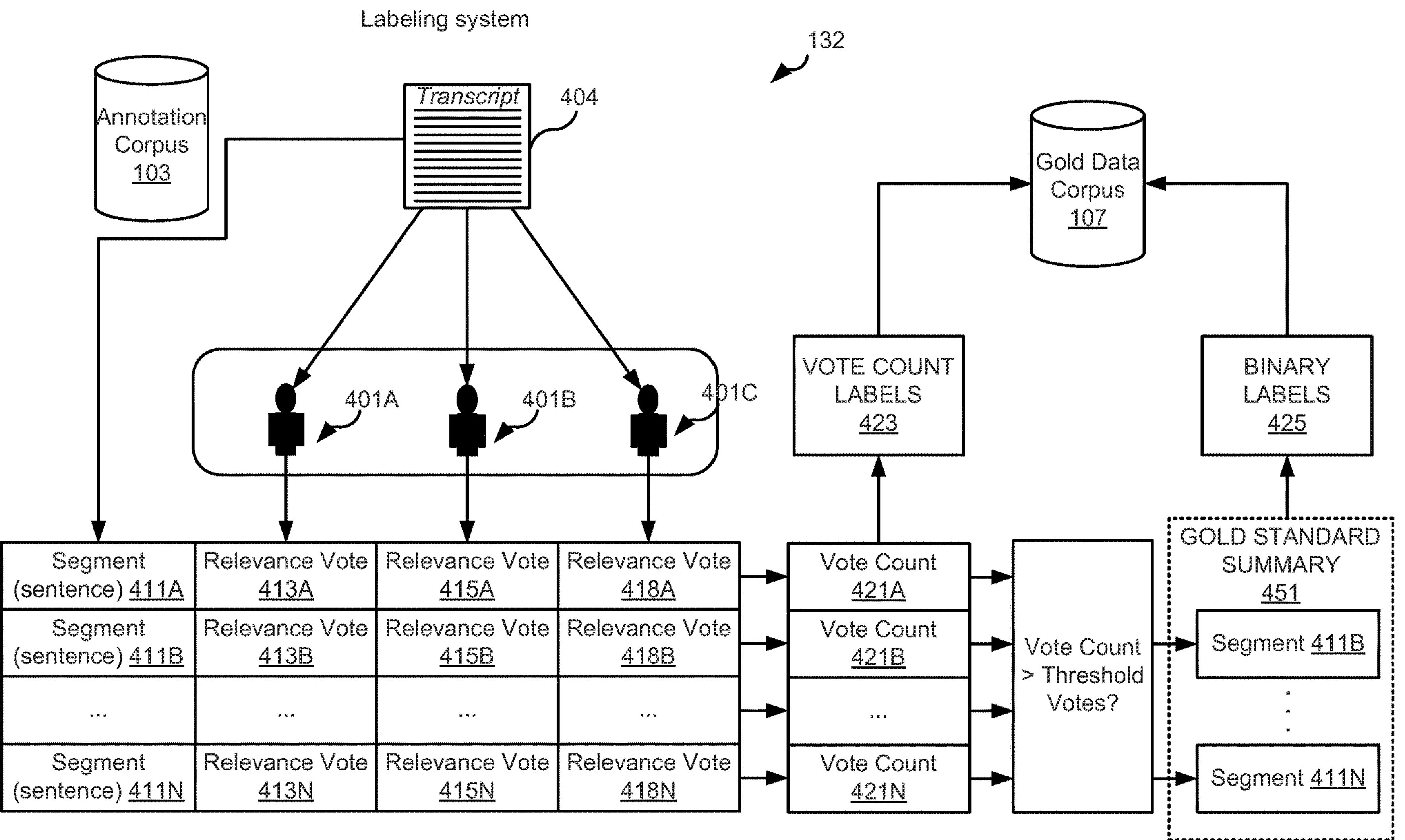
FIG. 4 illustrates an example of an annotation subsystem for obtaining and storing annotations for a gold standard corpus used to train the ML estimators illustrated in FIG. 1.

The annotation subsystem 132 may generate the gold standard corpus 107 based on annotations from subject matter experts. An example operation of the annotation subsystem 132 is shown in FIG. 4.

The machine-learning (ML) training subsystem 134 may train the ML regression estimator 160B and the binary classification estimator 160C. An example operation of training the ML regression estimator 160B and the binary classification estimator 160C is respectively shown in FIGS. 5A and 5B.

The machine-learning-natural language processing (ML-NLP) training subsystem 136 may train the ML-NLP estimator 160D and the pre-trained ML-NLP estimator 160E. An example operation of training the ML-NLP estimator 160D and the pre-trained ML-NLP estimator 160E is respectively shown in FIGS. 7A and 7B.

Machine learning, or "ML", may refer to an algorithm or instruction that may train an estimator or other model based on a training dataset to learn from the training dataset. NLP techniques may refer to computationally processing natural language text to understand the meaning or structure (such as grammatical structure, sentence structure, and the like) of the natural language text.

As used herein, an estimator (such as the ML-NLP estimator 160D and PT ML-NLP estimator 160E) trained by the ML-NLP training subsystem 136 may refer to a classification function that classifies content according to natural language text (words, phrases, and/or sentences) included in the content of a transcript 104. Such classification function may be trained based on machine-learning (ML) using natural language processing (NLP) techniques to learn from training data, such as various corpuses of data and/or labeled mapping data that include natural language text.

"Classify" may refer to generating a classification that indicates whether a given segment of a transcript 104 is relevant to the transcript 104. Such classification may be binary (yes/no) or continuous (range of values). A segment of a transcript 104 is relevant to the transcript 104 if the segment is to be included in the summary 161 of the transcript 104 or otherwise content for the summary 161 is based on the segment. In a rule-based context, such classification may be made based on the evaluation of rules. In a machine-learning context, such classification may be made based on supervised learning using labeled transcripts annotated by subject matter experts.

The transcript segmenter 150 may generate a plurality of segments of a transcript 104. Each segment may refer to a portion of the content of the transcript 104. For example, each segment may refer to a sentence of the transcription, although other portions may be used as segments. The transcript segmenter 150 may generate the segments in various ways. For examples in which segments are lines in the transcript 104, the transcript segmenter 150 may split the transcript 104 when new lines are encountered. For examples in which segments are sentences in the transcript 104, the transcript segmenter 150 may split the transcript 104 based on one or more language models that disambiguates sentences in text. These language models may be trained to recognize sentences since a simple use of punctuation may not recognize sentences in text properly. For example, a period (".") may not necessarily denote the end of a sentence. One example of such a language model may include the spaCy sentence segmenter, although others may be used as well or instead.

The estimator 160 may generate a segment score for each segment of a transcript 104. The segment score may refer to a relevance of a segment to the transcript 104. The segment score may be expressed as a binary score (such as having a 0 or 1 value), a range of values (such as 0.0-1.0), and/or other value.

The estimator 160 may include different types of estimators, such as a rule-based estimator 160A, a ML regression estimator 160B, a binary classification estimator 160C, a ML-NLP estimator 160D, and/or a pre-trained ("PT") ML-NLP estimator 160E. It should be noted that different estimators 160A-E may be used individually based on particular needs. For example, features or labeled data may be unavailable or insufficient, in which case the rule-based estimator 160A may be used. Conversely, sufficient knowledge to curate rules may be unavailable, in which case a machine-learning estimator (such as one of estimators 160B-E) may be used.

In some examples, one or more estimators 160A-E may be used together to obtain competing segment scores, and therefore competing summaries 161 of a particular transcript 104. In some of these examples, the summary 161 from an estimator 160A-E having the highest probability (or confidence) of being correct may be used. In some of these examples, two or more summaries 161 a particular transcript 104 from two or more of the estimator 160A-E may be combined to generate a final summary of the particular transcript 104.

The summary generator 170 generate a summary 161 of the transcript 104 based on the segment score from the estimator 160. For example, the summary generator 170 may include (or exclude) a given segment based on its segment score. It should be noted that to include a segment in the summary 161 may comprise including content that is based on the segment. For example, a given sentence or other segment of the transcript 104 may usually, but not necessarily, be an exact copy of the sentence or other segment.

Figure 2:
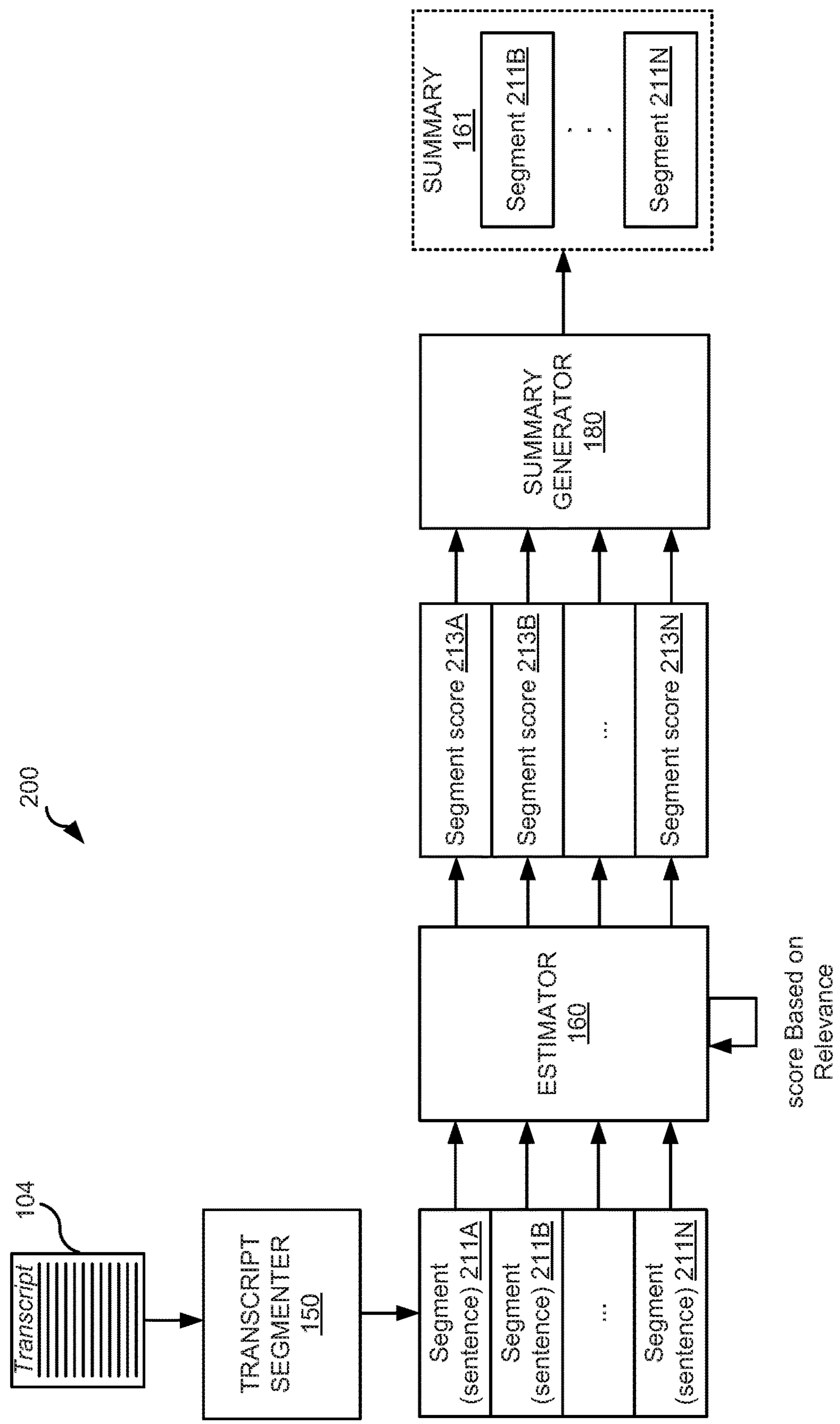
FIG. 2 illustrates a flow diagram of an example of using an estimator to generate a summary of a transcript.

FIG. 2 illustrates a flow diagram 200 of an example of using an estimator 160 to generate a summary 161 of a transcript 104. The transcript segmenter 150 may generate a plurality of segments 211A . . . N based on a transcript 104 to be summarized. The estimator 160 may analyze each segment 211 to generate a respective segment score 213A . . . N. The particular value and manner of generating a segment score 213 may depend on the type of estimator 160A-E used to generate the segment score. For example, the rule-based estimator 160A may generate an integer or other value that is incremented or decremented based on an evaluation of each rule against a segment 211. An example of such evaluation is described in FIG. 3. The ML regression estimator 160B may output a range of values, the binary classification estimator may output a probability value that a segment 211 is relevant, and the ML-NLP estimator 160D and the PT ML-NLP estimator 160E may each output a probability value that a segment 211 is relevant. The probability value may be a range of values greater than two (such as being non-binary). An example of a probability value may include a value between the range of 0.0 and 1.0 (where 1 indicates a 100 percent probability and a value between the range represent probabilities between zero and 100 percent).

The summary generator 170 may generate the summary 161 of the transcript 104 based on the segment scores 213. For example, the summary generator 170 may generate the summary 161 based on the top (K) segment scores 213, top (M) percent of segment scores, a threshold value (where segments 211 having scores 213 that meets the threshold value may be added to the summary 161), and/or other way to filter segments 211. In some examples, (K) may be an integer that is predefined and/or configurable such that the number of segments 211 included in the summary 161 is equal to K. In some examples, (M) may be a percentage value that is predefined and/or configurable such that the number of segments 211 included in the summary 161 is equal M percent of the original size of the transcript 204. The threshold value may be predefined based on empirical observations. In either of the foregoing examples, the summary generator 170 may generate the summary 161 using only a subset (not all of) the segments 211A . . . N based on their respective segment scores 213A . . . N.

Figure 3:
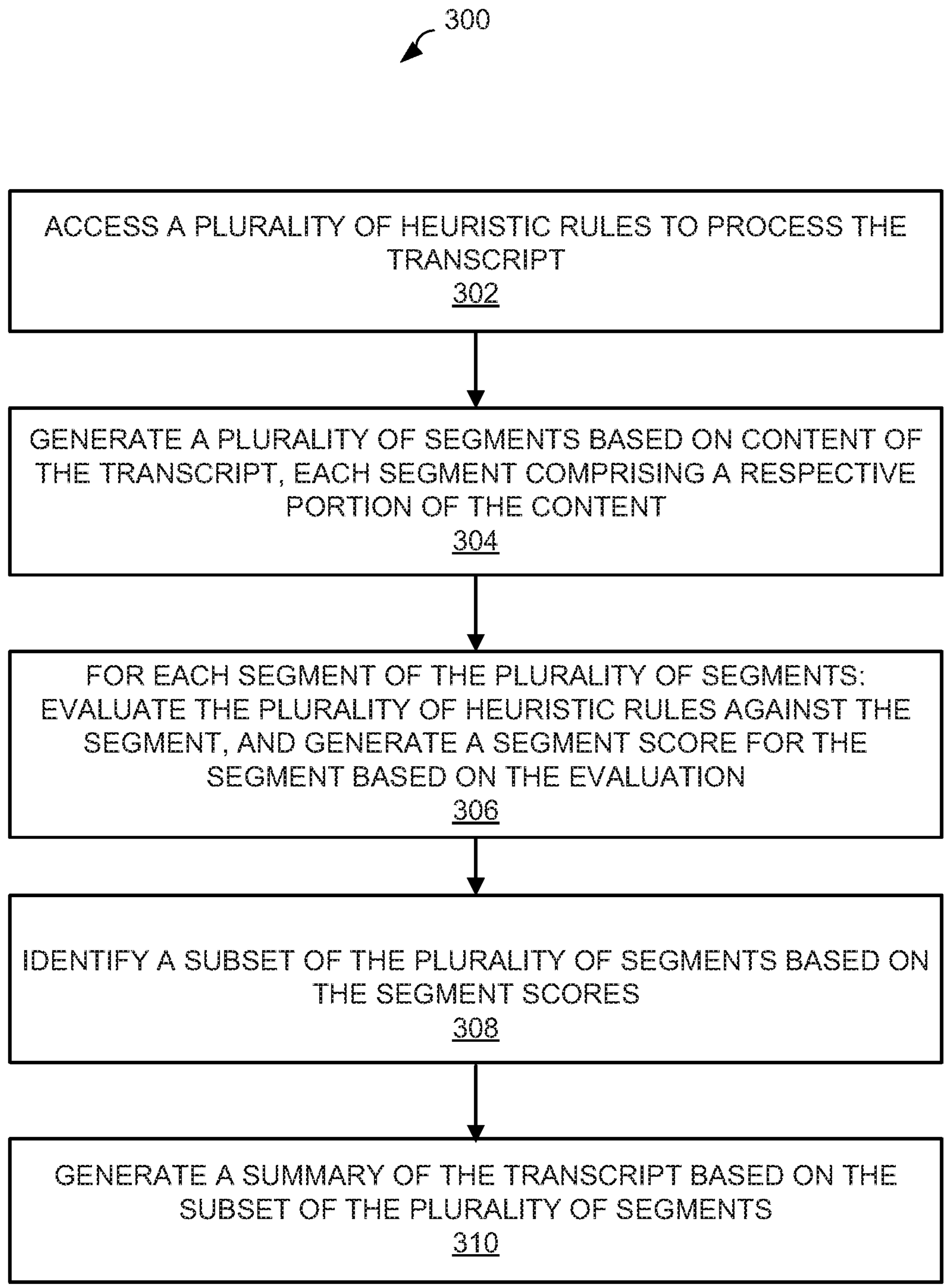
FIG. 3 illustrates an example of a method of generating a summary of a transcript based on a rule-based estimator.

FIG. 3 illustrates an example of a method 300 of generating a summary 161 of a transcript 104 based on a rule-based estimator (such as rule-based estimator 160A).

At 302, the method 300 may include accessing a plurality of heuristic rules to process the transcript. For example, the heuristic rules may be access from the heuristic rules database 101.

At 304, the method 300 may include generating a plurality of segments (such as segments 211 illustrated in FIG. 2) based on content of the transcript. Each segment may include a respective portion of the content. In some examples, each segment may include a sentence from the transcript.

At 306, the method 300 may include, for each segment of the plurality of segments: evaluating the plurality of heuristic rules against the segment, and generate a segment score (such as a segment score 213) for the segment based on the evaluation.

Examples of evaluating the rules and generating segment scores based on the evaluation will be described in the context of adding to or subtracting from segment scores, where higher segment scores denote higher relevance of the evaluated segment than lower segment scores. However, other scoring systems may be used.

In some examples, generating the segment score may include assessing a plurality of features with respect to the segment. Examples of features may include features f1-f9 illustrated in Table 2.

For example, a rule may specify that the segment score is to be increased (such as by one or other value) if the segment includes digit sequences and currency designators are seen together, which may indicate a financial result was spoken and is therefore relevant.

For example, a rule may specify that the segment score is to be increased (such as by one or other value) if a number of characters in the sentence exceeds a threshold number of characters, which may be predefined. The threshold number in some examples may be 50.

Another rule may specify that the segment score is to be increased (such as by one or other value) if a sentiment polarity value for the segment exceeds a predefined polarity threshold. One example of a sentiment polarity may include the VADER sentiment score, in which case the predefined polarity threshold may be 0.5. The VADER sentiment score is described in C. J. Hutton and Eric Gilbert. 2014, "VADER: A parsimonious rule-based model for sentiment analysis of social media text," Eighth International AAAI Conference on Weblogs and Social Media, ICWSM, pages 216-225, the content of which is incorporated by reference in its entirety.

Another rule may specify that the segment score is to be increased (such as by one or other value) if the segment includes a match in a set of financial lexicons. Examples of such financial lexicons are illustrated in Table 3.

Another rule may specify that the segment score is to be decreased (such as by three or other value) if the segment includes a match in a set of fluff phrases. Examples of such fluff phrases are illustrated in Table 3.

At 308, the method 300 may include identifying a subset of the plurality of segments based on the segment scores. For example, the method 300 may include selecting a top (K) number of segments based on segment scores, a top (M) percent of segments based on segments scores, a probability threshold indicating a minimum probability that the segment is relevant, and/or other metric to identify the subset of segments from among the plurality of segments of the transaction.

At 308, the method 300 may include generating a summary (such as summary 161) of the transcript based on the subset of the plurality of segments.

FIG. 4 illustrates an example of an annotation subsystem 132 for obtaining and storing annotations for a gold standard corpus used to train the ML estimators (such as estimators 160B-E) illustrated in FIG. 1. The annotation corpus 103 may include a plurality of transcripts, which may be similar to the type of transcript 104 illustrated in FIG. 1.

The annotation subsystem 132 may provide each transcript 404 of the annotation corpus 103 to subject matter experts (hereinafter, annotator 401). It should be noted that although only three annotators 401A . . . C are illustrated in FIG. 4, other numbers may be used. In a particular example, five annotators 401 may be used.

In some examples, the annotation subsystem 132 may provide the transcript 404 to each annotator 401 via a graphical user interface (GUI; not illustrated) that includes voting options to indicate a relevance vote. In some examples, the GUI may provide the segments 411A . . . N of the transcript 404 to be annotated along with the voting options for each segment. Each segment 411A . . . N may be similar to the segments generated by the transcript segmenter 150. For example, each segment 411 may be a sentence or other portion of the content of a transcript 404.

Each annotator 401 may be instructed to aim for a soft target summary size of 20% of segments compared to the original document length. Annotators 401 may be asked to judge all 20,463 sentences of the annotation corpus (102,315 total judgements). All annotators 401 processed all segments of all sample documents (complete overlap), leading to 5 binary judgments for each segment indicating whether or not the segment was relevant.

Each annotator 401 may analyze segments 411A . . . N of each transcript 404 and provide a relevance vote for each segment 411. A relevance vote may refer to an indication from the annotator 401 of whether or not the corresponding segment 411 should, in the annotator's judgement, be included in a summary of the transcript 404.

For example, annotator 401A may provide relevance votes 413A . . . N for respective segments 411A . . . N. Likewise, annotator 401B may provide relevance votes 415A . . . N for respective segments 411A . . . N, and annotator 401C may provide relevance votes 417A . . . N for respective segments 411A . . . N. Each annotator 401 may provide only one relevance vote per segment 411.

The annotation subsystem 132 may generate vote counts 421A . . . N for respective segments 411A . . . N. For example, vote count 421A may indicate a number of times that annotators 401A . . . N voted that segment 411A is relevant (should be included in the summary). The annotation subsystem 132 may generate vote count labels 423 based on the vote counts 421. Each vote count label 423 may include a corresponding segment 411 and its corresponding vote count 421. Thus, a vote count label 423 may include a label indicating a number of relevance votes that a corresponding segment 411 received. The annotation subsystem 132 may store the vote count labels 423 in the gold standard corpus 107 for training ML estimators (such as the estimators 160B-E).

In some examples, the annotation subsystem 132 may, for each segment 411, determine whether the corresponding vote count 421 meets or exceeds a threshold level. The threshold level may include a simple majority. For example, if five annotators 401 are used, then the threshold level may be set to three. Other threshold levels may be used instead. If the vote count 421 for a segment 411 meets or exceeds the threshold level, then the annotation subsystem 132 may add the segment 411 to a gold standard summary 451 for that transcript 404. In the illustrated example, segments 411B and 411N met the threshold level and have been added to the gold standard summary 451.

In some examples, the annotation subsystem 132 may store the gold standard summary 451 in the gold standard corpus 107 for training ML estimators (such as the estimators 160B-E) and/or evaluating the performance of any estimator 160 (estimators 160A-E). In some examples, the annotation subsystem 132 may generate binary labels 425 based on the determination of whether the vote count 421 meets or exceeds the threshold level. Each binary label 425 may include a corresponding segment 411 and indication of whether or not its respective vote count 421 exceeded the threshold value. Thus, a binary label 425 may include a label indicating whether or not (such as true/false or 0/1) the segment 411 was deemed to be relevant. The annotation subsystem 132 may store binary labels 425 in the gold standard corpus 107 for training ML estimators (such as the estimators 160B-E).

It should be noted that different ML estimators may be trained using different portions of the gold standard corpus 107, as will be described below.

Figure 5A:
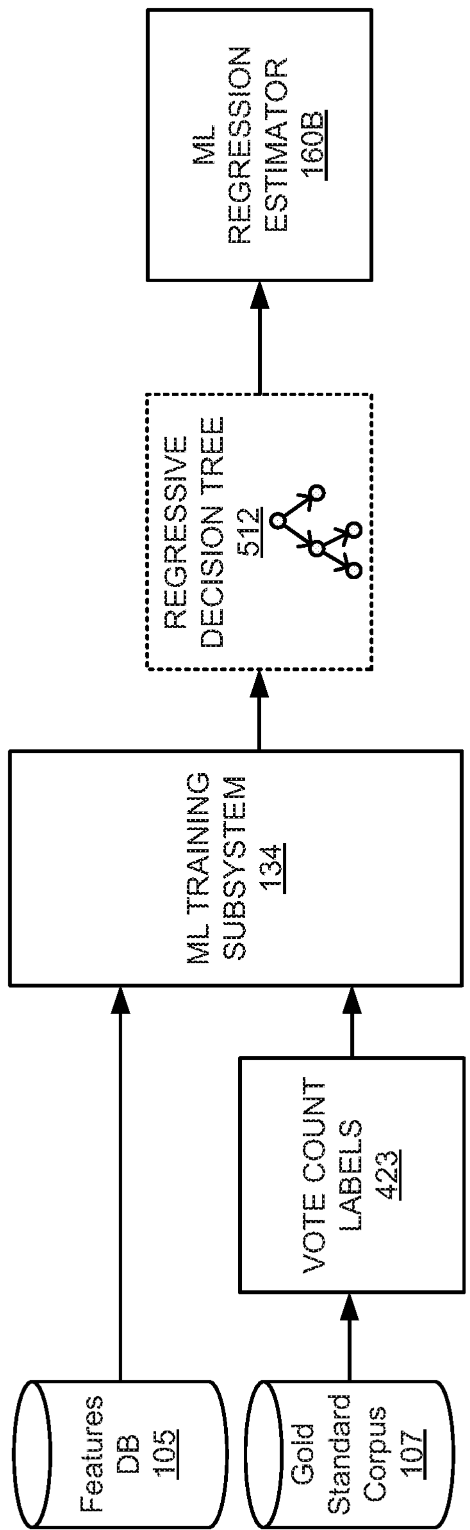
FIG. 5A illustrates an example of a flow diagram for training a ML regression estimator based on the gold standard corpus.

FIG. 5A illustrates an example of a flow diagram 500 for training an ML regression estimator 160B based on the gold standard corpus 107. In some examples, the ML regression estimator 160B may be a decision tree regressor that uses a regressive decision tree 512 trained by the ML training subsystem 134 based on features from the features database 105 and vote count labels 423 from the gold standard corpus 407.

The regressive decision tree 512 may refer to a decision tree in which the structure (order and weighted features) is constructed based on learned relationships between the features (such as features f1-f9 illustrated in Table 2) of the features database 105 found or not found in a segment and corresponding number of votes received by that segment in the vote count labels 423. For example, for each of features f1-f9 illustrated in Table 2, the ML training subsystem 134 may learn the importance of a feature in a segment in relation to the number of votes that the segment received, as recorded in the vote count labels 423. Based on the importance, or predictive relationship between a feature and number of votes, the ML training subsystem 134 may assign a weight to the feature. The ML training subsystem 134 may sample different orders of the structure of the decision tree to arrive at one in which the order and weights minimize error. The error may be measured as a mean squared error that includes the average squared difference between an estimated value (number of votes) and actual number of votes received by a segment. Thus, in some examples, an output of the ML regression estimator 160B, which may use the learned regressive decision tree 512, may include an estimate of the number of votes that the segment would receive. In some examples, the ML regression estimator 160B may be pruned to a maximum (N) levels, where N may be equal to 8 or other maximum value to prevent overfitting.

Figure 5B:
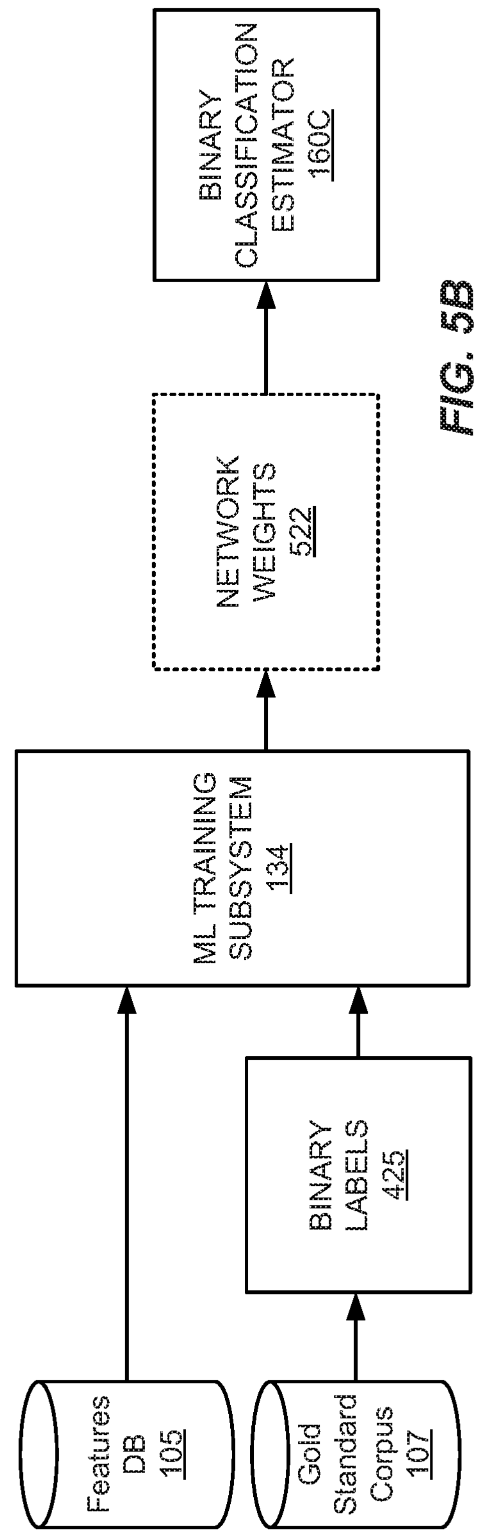
FIG. 5B illustrates an example of a flow diagram for training a binary classification estimator based on the gold standard corpus.

FIG. 5B illustrates an example of a flow diagram for training a binary classification estimator 160C based on the gold standard corpus 107. The ML training subsystem 134 may learn network weights 522 of features from the features database 105 using the binary labels 425 from the gold standard corpus 107. The ML training subsystem 134 may learn the network weights 522 based on learned relationships between the features (such as features f1-f9 illustrated in Table 2) of the features database 105 found or not found in a segment and corresponding binary determination of whether or not the segment was included in a summary by an annotator. For example, for each of features f1-f9 illustrated in Table 2, the ML training subsystem 134 may learn the importance of a feature in a segment in relation to whether the segment was included in a corresponding gold standard summary 451, as recorded in the binary labels 425. Based on the importance, or predictive relationship between a feature and number of votes, the ML training subsystem 134 may assign a network weight to the feature. The binary classification estimator 160C may use the network weights 522 to assign an input segment into a binary classification, such as a relevant classification or not relevant classification.

Figure 6:
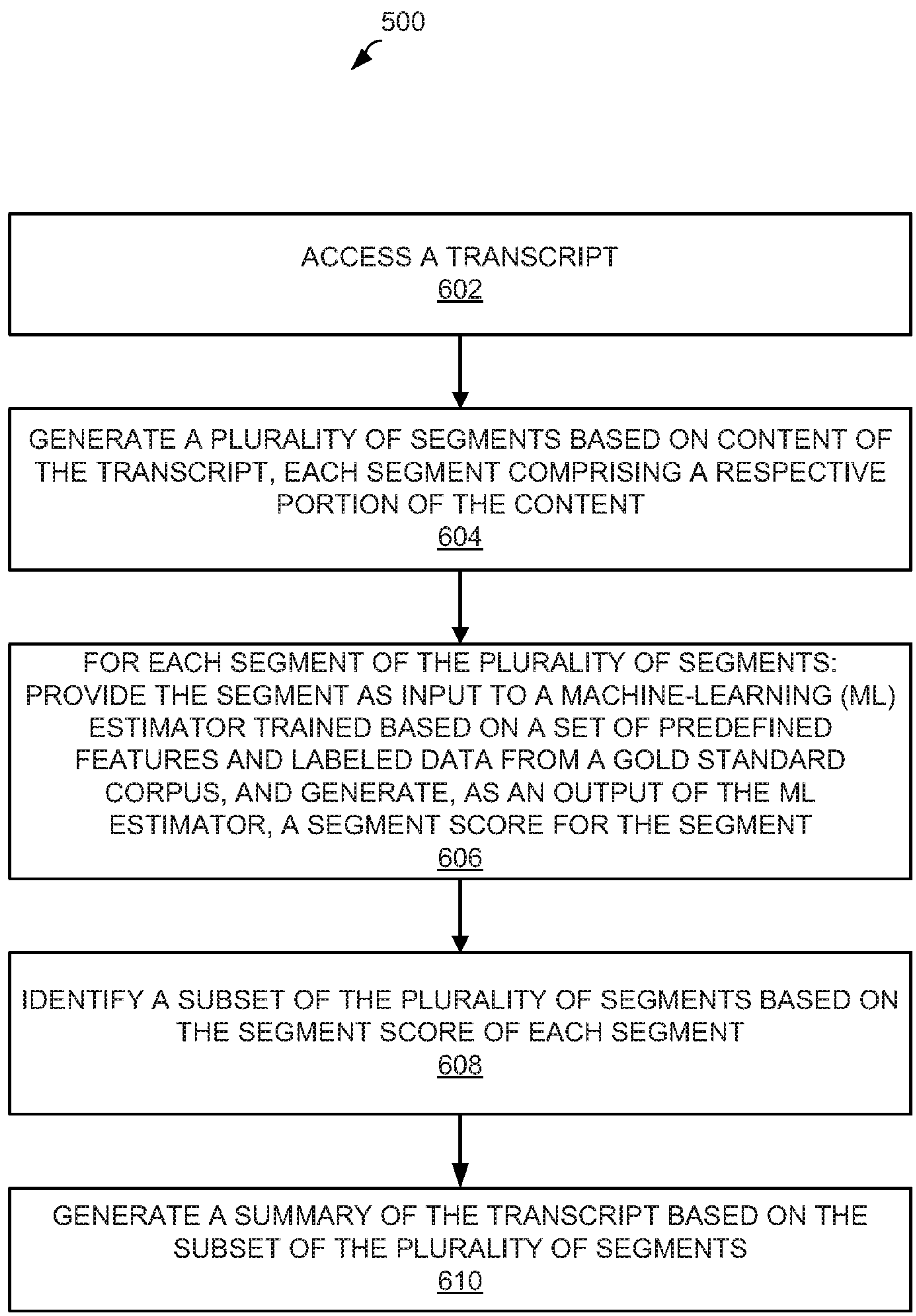
FIG. 6 illustrates an example of a method of generating a summary of a transcript based on a trained ML estimator (such as the ML regression estimator or the binary classification estimator) that uses features from the features database.

FIG. 6 illustrates an example of a method 600 of generating a summary of a transcript (such as transcript 104) based on a trained ML estimator (such as the ML regression estimator 160B or the binary classification estimator 160C) that uses features (such as features f1-f9 in Table 2) from the features database 105.

At 602, the method 600 may include accessing the transcript. For example, the transcript may be accessed by the system to automatically summarize the transcript.

At 604, the method 600 may include generating a plurality of segments (such as segments 211) based on content of the transcript. Each segment may include a respective portion of the content. In some examples, each segment may include a sentence of the transcript.

At 606, the method 600 may include, for each segment of the plurality of segments providing the segment as input to a machine-learning (ML) estimator trained based on a set of predefined features and labeled data from a gold standard corpus, and generating, as an output of the ML estimator, a segment score for the segment. The ML estimator may include the ML regression estimator 160B or binary classification estimator 160C.

At 608, the method 600 may include identifying a subset of the plurality of segments based on the segment score of each segment. At 610, the method 600 may include generating a summary (such as summary 161) of the transcript based on the subset of the plurality of segments.

Figure 7A:
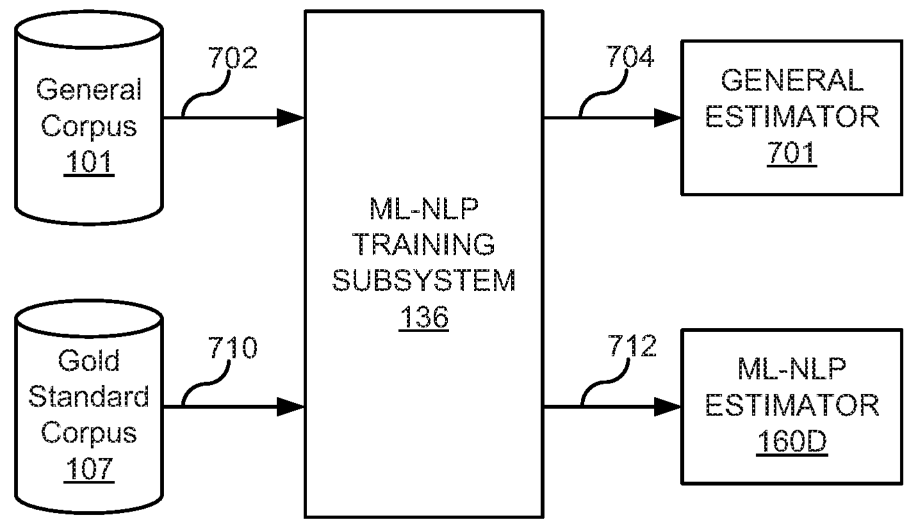
FIG. 7A illustrates an example of a flow diagram for training an ML-NLP estimator based on a general corpus and fine-tuning the ML-NLP estimator based on the gold standard corpus.

FIG. 7A illustrates an example of a flow diagram for training a ML-NLP estimator based on a general corpus 109 and fine-tuning the ML-NLP estimator based on the gold standard corpus 107.

For example, at 702, the ML-NLP training subsystem 136 may access the general corpus 109. At 704, the ML-NLP training subsystem 136 may train a general estimator 701 to learn a general language model based on the general corpus 109. One example of a general estimator 701 may include a BERT model, which is described in "BERT: Pre-training of Deep Bidirectional Transformers for Language Understanding," Jacob Devlin, Ming-Wei Chang, Kenton Lee, Kristina Toutanova (available at https [://] arxiv [.] org [/] abs [/] 1810.04805v2), the content of which is incorporated by reference in its entirety herein. BERT is a neural language model capable of learning word representations from large volumes of unannotated text. The BERT language model may include 12 layers, 12 attention heads, 768 hidden units, and 110 million parameters.

BERT embeddings are highly contextual due to its deep and bidirectional (i.e. left-to-right and right-to-left) formulation. The ML-NLP training subsystem 136 may use a masked language model that learns to predicts words randomly masked from a sequence, and whether two sentences in a document naturally follow each other (next sentence prediction), and may leverage a "transformer" encoder/decoder architecture which uses attention mechanisms to forward a more complete picture of the whole sequence to the decoder at once, rather than sequentially.

At 710, the ML-NLP training subsystem 136 may access the gold standard corpus 107. At 712, the ML-NLP training subsystem 136 may fine-tune (further train) the general estimator 701 using the gold standard corpus 107 to generate the ML-NLP estimator 160D. For examples that use BERT, the BERT checkpoint files generated after training on the general corpus 109 may be used for fine-tuning. In some examples, cased versions (version in which capitalization of words are taken into account) of BERT checkpoint files may be used. The training parameters for the fine-tuning may include 40 epochs using a learning rate of 1 e-5, a dropout rate of 0.1, a learning rate warm-up proportion of 0.1, a batch size of 64 and a mean squared error (MSE) loss function. Other parameters may be used instead.

For examples that use BERT, the general estimator 701 may be modified by adding a linear layer to generate the ML-NLP estimator 160D. The linear layer may, in some examples, include a linear activation function that outputs a range of values (which may correspond to the labels of the gold standard corpus 107). Other types of activation functions may be used as well on top of the general estimator 701. Inputs to the models described herein may include segments (such as single sentences) from a transcript, and a predicted score is generated for each by passing the classification token (CLS) representation through the linear layer and a sigmoid function. The sigmoid function may include activation function, which may represent the output of the linear layer to a range between 0 and 1. The predicted score (the output) may represent a probability that the segment is relevant and should therefore be including in a summary of the transcript.

Figure 7B:
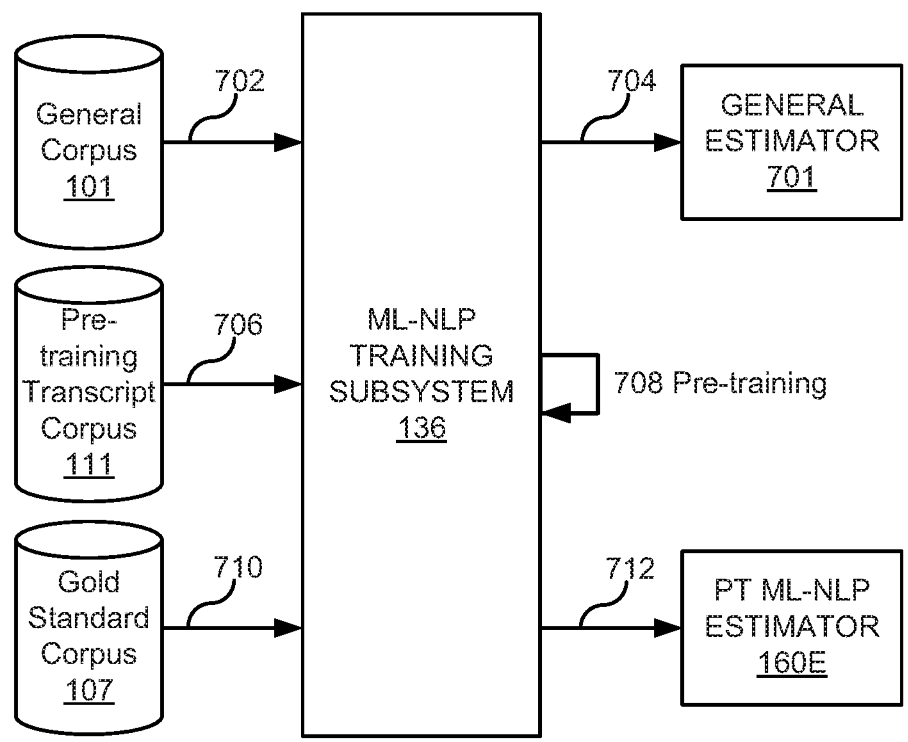
FIG. 7B illustrates an example of a flow diagram for training an PT ML-NLP estimator based on a general corpus, further pre-training based on a transcript corpus, and fine-tuning the ML-NLP estimator based on the gold standard corpus.

FIG. 7B illustrates an example of a flow diagram for training a PT ML-NLP estimator 160E based on a general corpus 109, further pre-training based on a pre-training transcript corpus 111, and fine-tuning the ML-NLP estimator based on the gold standard corpus. The flow diagram in FIG. 7B has the same parts (702, 704, 710, and 712) as the flow diagram illustrated in FIG. 7A, except that before fine-tuning at 712 and after training the general estimator 701 at 704, the ML-NLP training subsystem 136 adds further pre-training at 708 using data from the pre-training transcript corpus 111 obtained at 706. As used herein, the term "pre-training" may refer to training and/or other activities that may occur prior to further augment the general estimator 701 to make the general estimator 701 more domain-specific. In particular, the pre-training at 708 may further train the general estimator 701 to be specific for transcripts to improve performance in estimating the relevance of segments of a given transcript. Pre-training parameters may include a batch size of 512 for 2.5 million steps at a maximum sequence length of 128 tokens, and then 500,000 steps at a maximum sequence length of 512 tokens, since the long sequences are mostly needed to learn positional embeddings which can be learned fairly quickly.

It should be noted that the ML-NLP estimator 160D and/or the PT ML-NLP estimator 160E may be trained with or without human-engineered features, such as features f1-f9 illustrated in Table 2. For example, the ML-NLP estimator 160D and/or the PT ML-NLP estimator 160E may not require training to identify relationships between human-engineered features and corresponding labels indicating segment relevance. Instead, the ML-NLP estimator 160D and/or the PT ML-NLP estimator 160E may, in examples that do not use human-engineered features for training, rely on language modeling based on the general corpus 109 and fine-tuning based on the gold standard corpus 107. The PT ML-NLP estimator 160E may further use further pre-training based on the pre-training transcript corpus 111.

Figure 8:
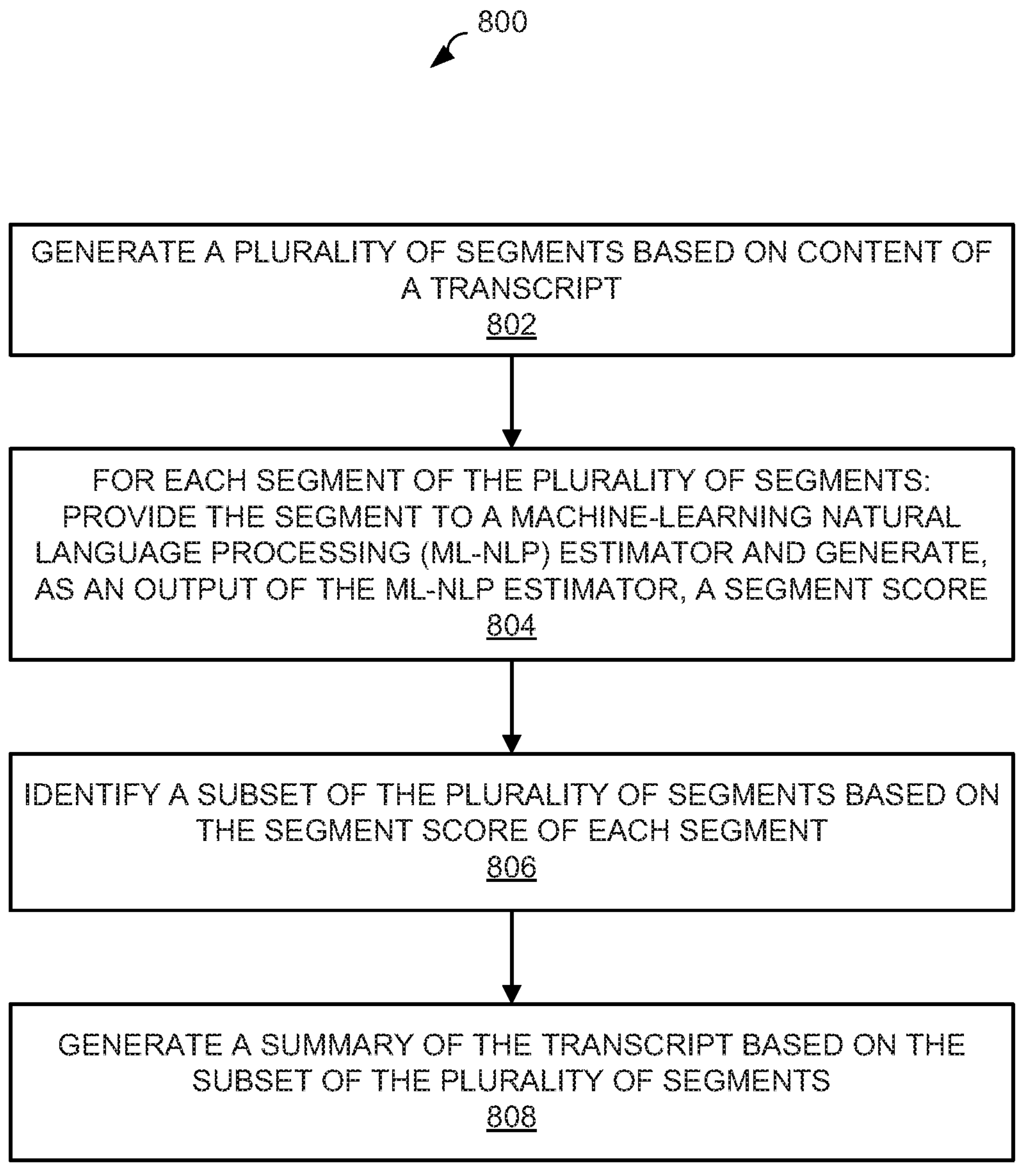
FIG. 8 illustrates an example of a method of generating a summary of a transcript based on an NLP estimator.

FIG. 8 illustrates an example of a method 800 of generating a summary of a transcript based on an NLP estimator (such as the ML-NLP estimator or the PT ML-NLP estimator). At 802, the method 800 may include generating a plurality of segments (such as segments 211 illustrated in FIG. 2) based on content of the transcript. Each segment may include a respective portion of the content. In some examples, each segment may include a sentence of the transcript.

At 804, the method 800 may include, for each segment of the plurality of segments: providing the segment to a machine-learning natural language processing (ML-NLP) estimator (such as an ML-NLP estimator 160D or PT ML-NLP estimator 160E) and generating, as an output of the ML-NLP estimator, a segment score (such as a segment score 213). The ML-NLP estimator may be pre-trained on a general corpus (such as general corpus 109) to learn a general language model and then fine-tuned on a gold standard corpus (such as gold standard corpus 107) of transcripts comprising a plurality of annotated segments from an annotation corpus (such as annotation corpus 103) of transcripts. Each annotated segment may be labeled to indicate a number of relevance votes (such as relevance votes 413, 415, 417) from annotators (such as annotators 401). Each relevance vote may indicate that an annotator indicated that the segment is relevant to a corresponding transcript in the annotation corpus of transcripts.

At 806, the method 800 may include identifying a subset of the plurality of segments based on the segment score of each segment. At 808, the method 800 may include generating a summary (such as a summary 161) of the transcript based on the subset of the plurality of segments.

Figure 9A:
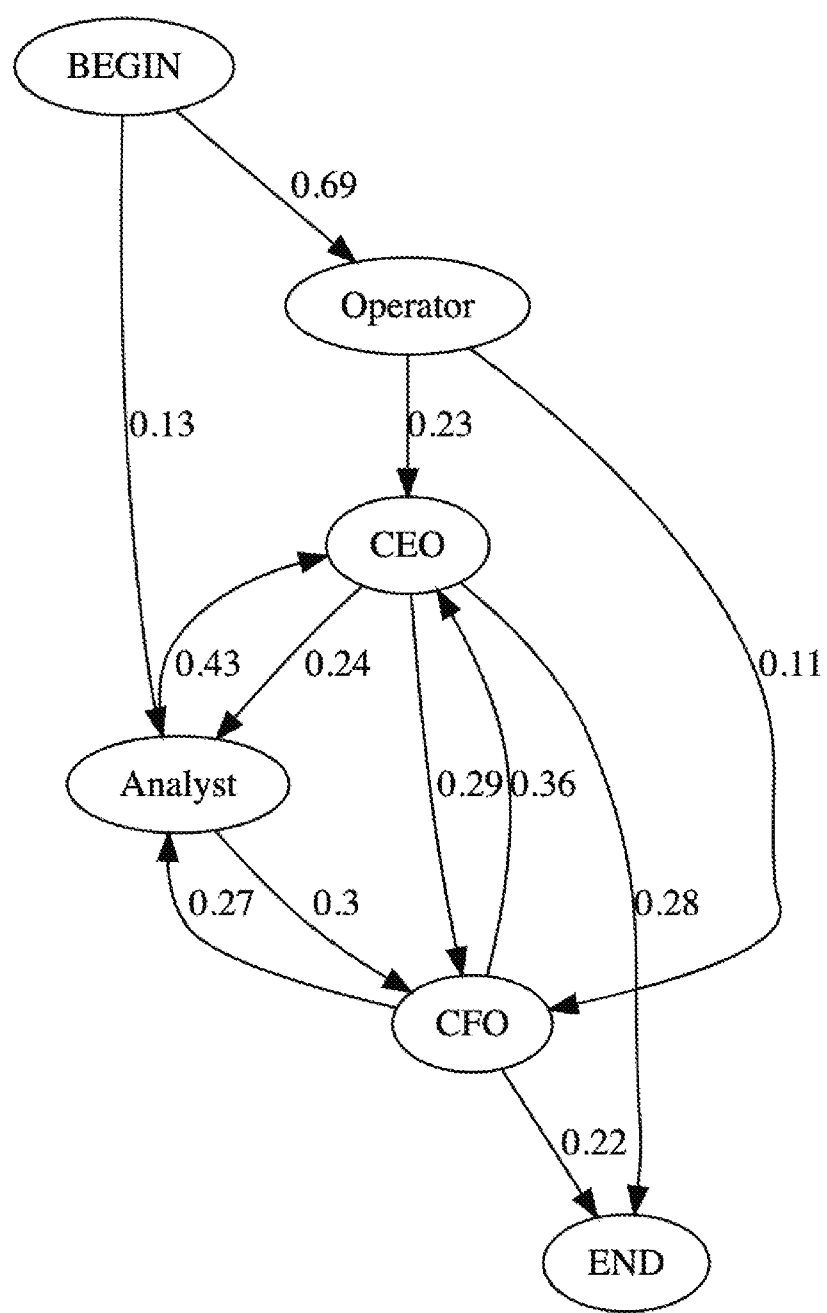
FIGS. 9A and 9B each show a 4-state Markov chain model that represents transition probabilities between call attendee role turns.
Figure 9B:
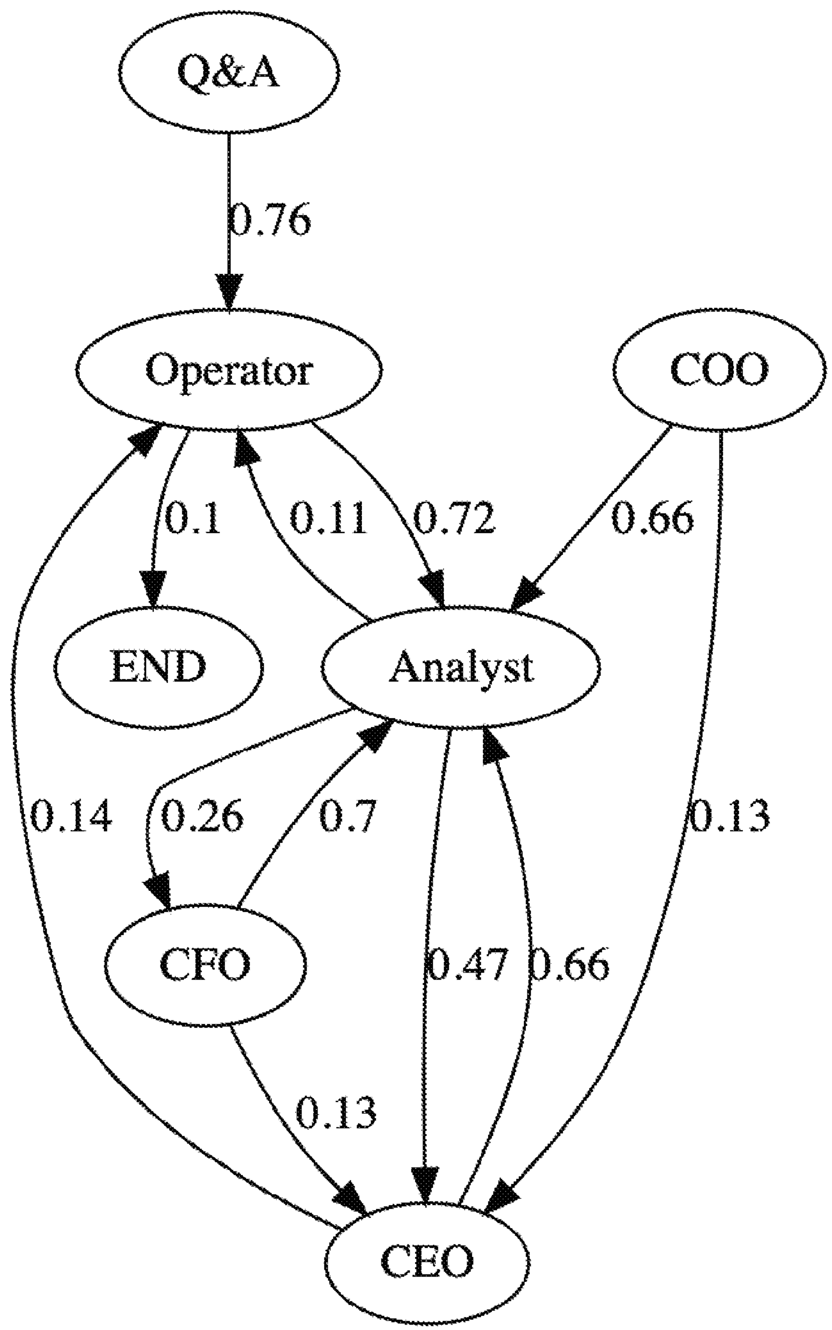

FIGS. 9A and 9B each show a 4-state Markov chain model that represents transition probabilities between call attendee role turns. FIG. 9C represents shows a formal grammar for turn-taking in transcripts. Based on the nature of the transcripts analyzed, the turn-taking structure of the data may be leveraged for further insight on segment relevance. For example, FIGS. 9A and 9B shows a 4-state Markov chain model, which was extracted from a set of earnings calls. For example, the 4-state Markov chain model may be based on 390,000 transcripts of earnings calls that occurred between 2001-2018. FIGS. 9A and 9B show the transition probabilities (illustrated as edges depicted by arrows with a corresponding probability value expressed as a decimal value) between call attendee role turns (illustrated as nodes between edges), which may be marked up in the transcript metadata. As shown, transitions with probabilities <10% are filtered out for clarity. Transitions from/to participants with unidentified roles are likewise omitted (note: this filtering explains why probabilities may not add up to one). The rules illustrated in FIG. 9C shows a human-engineered, simplified and abstracted formal grammar over the terminal symbols Operator, Analyst, CEO and CFO. It shows that the core loci of interaction are the turns between CEO and CFO (sometimes COOs participate, too) in the presentation part and between the analyst and either the CEO or CFO, respectively, in the question and answer part of the call: compared to informal business meetings (e.g. to find a decision) earnings calls are highly scripted and formulaic. Such turn-taking may be used as features for machine-learning to understand how turn-taking may impact the relevance of surrounding segments. For example, a turn-taking from an analyst to a CEO may indicate that the following segment may be relevant. Rules may also be engineered to take into account these observations as well.

Baselines for Comparison

The performance of the estimators 160 was assessed against baseline techniques for comparison. The baseline techniques included a random technique, a 2GREP technique, a Luhn technique, a LexRank technique, a BertSum technique. The random technique includes a random baseline, drawing from a uniform distribution until the number of sentences equals 20% of the expected summary length. The 2GREP technique may use a one-line UNIX baseline summarizer that parses transcripts in two parts: the first part retains sentences that contain numbers, since monetary amounts are important and the second part fishes for key company performance indicators in the hope that the numeric information pertains to these (note the cascaded filter implements an implied Boolean "AND" operator). 2GREP's summaries are short, so there may be no need to control size by imposing a 20% cut-off compared to other methods.

The Luhn technique is a simplified version of a term frequency-inverse document frequency (TF-IDF) calculation of words within sentence-units and takes into account density. An example of the Luhn technique is described in H. P. Luhn. 1958. The Automatic Creation of Literature Abstracts. IBM Journal of Research Development, 2(2):159-165, the content of which is incorporated by reference in its entirety herein.

The LexRank technique is an unsupervised, graph-based approach inspired by the random walker model that is also behind PAGERANK system from Brin and Page (1998); it uses centrality scoring of sentences.

The BertSum technique (Liu, 2019) is a simple variant of BERT with inter-sentence Transformer layers. In BertSum, as well as BERT, position embeddings have a maximum length of 512 tokens. In the majority of summarization data sets, this length is sufficient and longer documents can be truncated without loss of information, at least with regards to the gold-standard summary. A follow-up paper by the same authors (Liu and Lapata, 2019) allows extending the length of the document further to 800 tokens, in order to accommodate the NYT data set (Sandhaus, 2008).

In some examples, the documents in the gold standard corpus was not sufficient for re-training BertSum and the documents are significantly larger (average number of tokens is 7,339). The mean length of the expected summaries was also longer than 512 tokens. In order to overcome the above issues, each of the documents were broken into chunks of 512 tokens, allowing for one sentence overlap (stride of size 1). For each chunk, the score of the segments were collected. The scores were aggregated for the whole document (transcript), and the highest scored sentences were kept to generate a summary of size equal to the gold standard summary length.

Quantitative Evaluation

A component-based evaluation using the gold standard corpus 107 for assessing the quality of a range of estimators and measured precision (P), recall (R), and F1-score (see Table 4).

TABLE 4

Evaluation results (best scores in starred*; note that comparison methods (rows 1-4) are arranged roughly in order of increasing complexity, and that the Pyramid score broadly decreases (rows 2-5) rather than increases with method complexity).

| | | Macro (documents) | | | Micro (segments such as sentences) | | |
|---|---|---|---|---|---|---|---|
| Method | Pyramid | Precision | Recall | F1 | Precision | Recall | F1 |
| Random baseline | 0.36 | 0.25 | 0.20 | 0.22 | 0.24 | 0.20 | 0.22 |
| 2GREP baseline | 0.74 | 0.79* | 0.12 | 0.19 | 0.78* | 0.11 | 0.19 |
| Luhn | 0.49 | 0.31 | 0.35 | 0.32 | 0.28 | 0.35 | 0.31 |
| LexRank | 0.42 | 0.25 | 0.31 | 0.27 | 0.23 | 0.31 | 0.27 |
| BertSum | 0.38 | 0.25 | 0.25 | 0.24 | 0.23 | 0.25 | 0.24 |
| Rule-based estimator 160A | 0.49 | 0.36 | 0.36 | 0.35 | 0.34 | 0.36 | 0.35 |
| ML regression estimator 160B | 0.61 | 0.52 | 0.42 | 0.46 | 0.49 | 0.41 | 0.45 |
| Binary classifi-cation estimator 160C | 0.78 | 0.65 | 0.53 | 0.57 | 0.62 | 0.52 | 0.57 |
| ML-NLP estimator 160D | 0.86* | 0.74 | 0.61* | 0.66* | 0.71 | 0.60* | 0.65 |
| PT ML-NLP estimator 160E | 0.86* | 0.74 | 0.61* | 0.66* | 0.72 | 0.60* | 0.66* |

Figure 10:
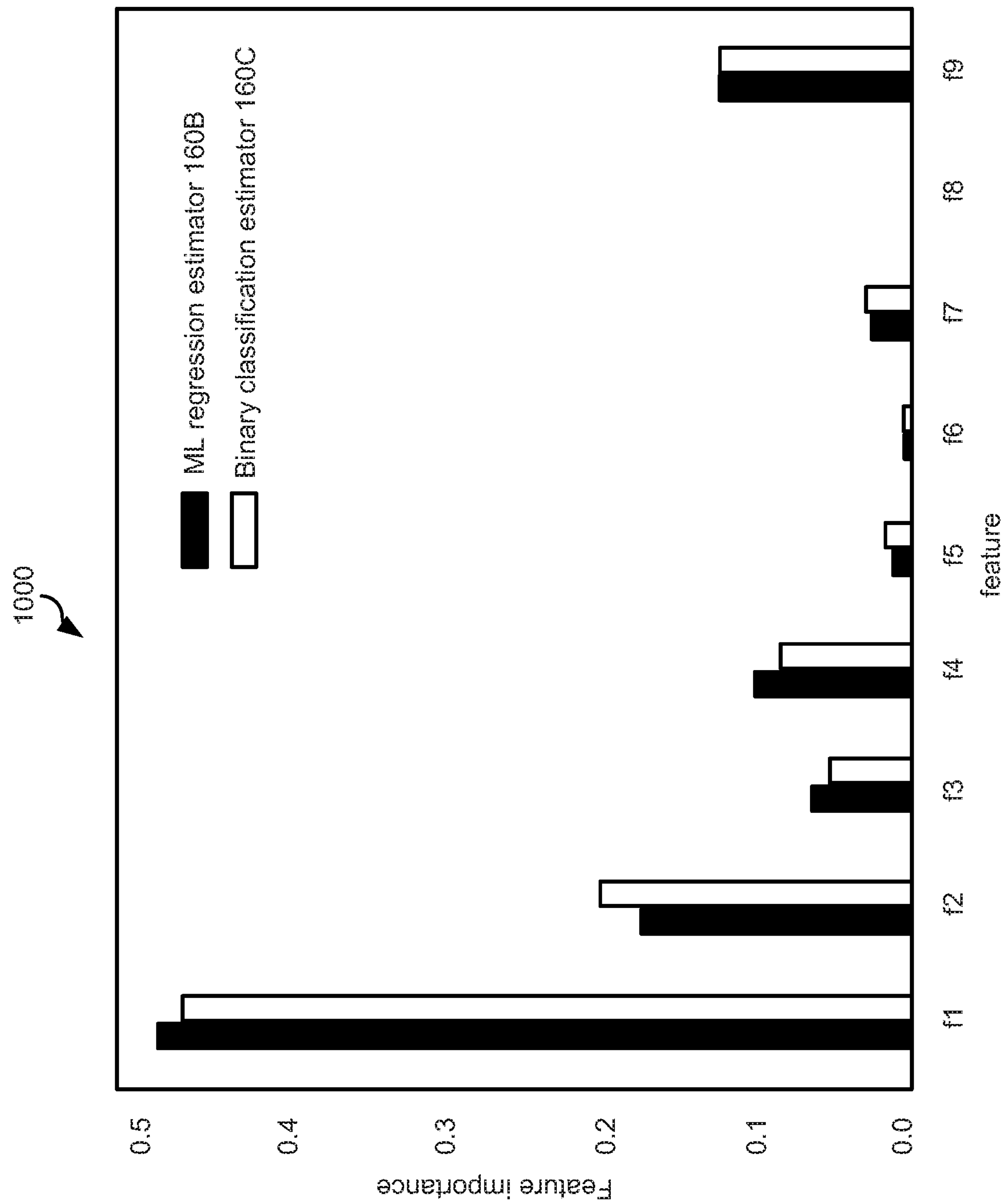
FIG. 10 illustrates a plot showing importance of features for the ML regression estimator and the binary classification estimator.

Both macro- and micro-average results are reported because the task is document-centric (macro) but the unit of decision is a segment such as a sentence (micro). For the two learning-based systems where human-engineered features play a role, namely the ML regression estimator 160B and the binary classification estimator 160C, the contributions of the features were analyzed, as illustrated in the example plot 1000 of FIG. 10. Plot 1000 includes a level of feature importance to the ML regression estimator 160B (shown in black shading) and the binary classification estimator 160C (shown in white shading). Some of the features (f5, f6 and f8) contribute little, which could be due to the small size of the lexicons, or the inclusion of terms the mention of which is not correlated with summary relevance. The Pyramid score, a consensus-based metric that scores a proposed summary against a pool of human-generated summaries. Each segment identified as relevant by an estimator may be assigned a rank based on the number of appearances of those segments in human-annotated summaries in the gold standard corpus 107. A summary is scored based on the sum of its ranked units, normalized by the optimal score it would have achieved for its length. The exact formula used is computed as follows:

Let vi be the number of votes a sentence with index i has received. For a given summary S of length n, the weight of the summary may be defined according to Equation (1):

$$D=\Sigma i \varepsilon S^{v}{}_{i} \quad (1).$$

The optimal weight, $w_{Max}$ for the summary, S, is assigned as the weight acquired for its given length based on Equation (2):

$$wMax = \sum i \varepsilon S^{v}_{Max} i, \text{ where } |SMax| = |S| \text{ and } S_{Max} = \underset{x}{\operatorname{argmax}}\{vx\} = \{x \mid \forall\, y: vy \leq vx \wedge y \in wMax\}. \quad (2)$$

The pyramid score is defined according to Equation (3):

$$P = \frac{D}{w_{Max}}. \quad (3)$$

Qualitative Evaluation

In addition to the component-based quantitative results a set of summary outputs were also observed. Examples of qualitatively "good" sentences that make it to summaries include (1) and (2):

(1) Gross profit is down SEK 16 million.

(2) Q1 EBITDA declined 20.1% to RUB 3.993 billion.

Occasionally, some sentences may include unavailable context material, such as:

(3) And we'll start at Page 2 with some numbers of the quarters, and as you can see, we have slightly reduced sales, or we'll be back on that because it's mainly due to some specific FX.

Discussion

Generally, previously proposed methods perform poorly on the earnings call transcripts, suggesting they are limited to document types like news. First, for the random baseline, experiments were repeated 1,000 times and mean values were calculated; for all metrics reported, standard deviation was <0.01. The 2GREP baseline suffers from recall problems, since summaries generated by 2GREP are shorter than the expected summary. BertSum and LexRank perform poorly, a finding which suggests earning call documents differ significantly compared to news. BertSum underperforms at least because Bert-Sum has been fine-tuned only on news and, by introducing sliding windows, BERTSum can access text beyond 512 tokens, but the trade-off is it can no longer use the relative position of sentences.

It should be understood that the methods 300, 600, and 800 illustrated in FIGS. 3, 6, and 8 may each include additional operations and that some of the operations described therein may be removed and/or modified without departing from the scopes of the methods 300, 600, and 800. The description of the methods 300, 600, and 800 may be made with reference to the features depicted other figures for purposes of illustration. Some or all of the operations set forth in each of the methods 300, 600, and 800 may be performed by one or more of the components illustrated in FIG. 1. As such, some or all of the operations set forth in each of the methods 300, 600, and 800 may be included as circuitry, utilities, programs, or subprograms, in any desired computer accessible medium. In addition, each of the methods 300, 600, and 800 may be embodied by computer programs, which may exist in a variety of forms. For example, some operations of each of the methods 300, 600, and 800 may exist as computer-readable instructions, including source code, object code, executable code or other formats.

The databases described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

For simplicity and illustrative purposes, the disclosure included descriptions that may refer to examples. In the description, numerous specific details have been set forth in order to provide a thorough understanding of the present disclosure. It will be readily apparent however, that the disclosure may be practiced without limitation to these specific details. In other instances, some methods and structures have not been described in detail so as not to unnecessarily obscure the present disclosure.

All references referred to herein are incorporated by reference in their entireties herein for all purposes.

Throughout the disclosure, the terms "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A computer system to automatically summarize a transcript, the computer system comprising:

a processor programmed to:

access the transcript, wherein the transcript is transcribed from audio having spoken words or phrases relating to a subject matter domain;

generate a plurality of segments based on content of the transcript, each segment comprising a respective portion of the content;

for each segment of the plurality of segments:

provide the segment as input to a machine-learning (ML) estimator specifically trained based on a set of predefined features and labeled data from a gold standard corpus comprising a plurality of gold standard summaries that was generated from other transcripts of corresponding audio having respective spoken words or phrases relating to the subject matter domain, wherein for each gold standard summary of the plurality of gold standard summaries, a given segment from the corresponding transcript is added to the gold standard summary when a predefined number or percentage of annotators agreed that the given segment should be added to the gold standard summary;

generate, as an output of the ML estimator, a segment score for the segment;

identify a subset of the plurality of segments based on the segment score of each segment; and generate a summary of the transcript based on the subset of the plurality of segments.

2. The computer system of claim 1, wherein the ML-estimator comprises an ML regression estimator, and wherein the labeled data comprises a plurality of annotated segments from an annotation corpus of transcripts, each annotated segment being labeled to indicate a number of relevance votes assigned to the annotated segment from annotators, each relevance vote indicating that an annotator indicated that the segment is relevant to a corresponding transcript in the annotation corpus of transcripts.

3. The computer system of claim 2, wherein the processor is further programmed to:

generate, based on learned relationships between each of the set of predefined features and the number of relevance votes assigned to the annotated segment, a regressive decision tree used by the ML regression estimator to generate the segment score for each segment of the transcript.

4. The computer system of claim 3, wherein to generate the segment score, the processor is further programmed to, for each segment of the plurality of segments:

apply the regressive decision tree to each segment of the plurality of segments to generate the segment score from among a range of values greater than two.

5. The computer system of claim 1, wherein the ML-estimator comprises an ML binary classification estimator, and wherein the labeled data comprises a plurality of annotated segments from an annotation corpus of transcripts, each annotated segment being labeled with a binary label to indicate whether or not the annotated segment was determined to be relevant to a corresponding transcript in the annotation corpus of transcripts.

6. The computer system of claim 5, wherein the processor is further programmed to, for each feature of the set of predefined features:

learn a respective weighted relationship between the feature and the binary label of each annotated segment.

7. The computer system of claim 6, wherein to generate the segment score, the processor is further programmed to, for each segment of the plurality of segments:

apply each respective weighted relationship to each segment of the plurality of segments to generate the segment score; and classify each segment as relevant or not relevant based on the segment score, wherein only segments classified as relevant are identified for the subset of the plurality of segments.

8. A computer system to automatically summarize a transcript, the computer system comprising:

a processor programmed to:

generate a plurality of segments based on content of the transcript, each segment comprising a respective portion of the content, wherein the transcript is transcribed from audio having spoken words or phrases relating to a subject matter domain;

for each segment of the plurality of segments:

provide the segment to a machine-learning natural language processing (ML-NLP) estimator, the ML-NLP estimator being specifically pre-trained on a general corpus to learn a general language model and then fine-tuned on a gold standard corpus comprising a plurality of gold standard summaries of transcripts that was generated from other transcripts of corresponding audio having respective spoken words or phrases relating to the subject matter domain, the gold standard corpus of transcripts comprising a plurality of annotated segments from an annotation corpus of transcripts, each annotated segment being labeled to indicate a number of relevance votes from annotators, each relevance vote indicating that an annotator indicated that the segment is relevant to a corresponding transcript in the annotation corpus of transcripts, wherein for each gold standard summary of the plurality of gold standard summaries, a given segment from the corresponding transcript is added to the gold standard summary when a predefined number or percentage of annotators agreed that the given segment should be added to the gold standard summary;

generate, as an output of the ML-NLP estimator, a segment score;

identify a subset of the plurality of segments based on the segment score of each segment; and generate a summary of the transcript based on the subset of the plurality of segments.

9. The computer system of claim 8, wherein the processor is further programmed to:

prior to fine-tuning, further pre-train the general language model based on a pre-training transcript corpus to learn a domain-specific language model that is transcript-specific.

10. The computer system of claim 8, wherein the ML-NLP estimator is trained without human-engineered features.

11. The computer system of claim 8, wherein the plurality of segments are each sentences, and wherein to generate the plurality of segments, the processor is further programmed to:

disambiguate a plurality of sentences of the transcript.

12. The computer system of claim 8, wherein to generate the cumulative segment score, the processor is further programmed to, for each segment of the plurality of segments:

generate a probability that the segment should be included in the summary.

13. The computer system of claim 8, wherein the general language model generates a classification token for each segment, and wherein to generate the cumulative segment score, the processor is further programmed to, for each segment:

pass the classification token through a linear layer added to the general language model and a sigmoid function to generate the cumulative segment score as a probability.

14. The computer system of claim 13, wherein the general language model comprises a Bidirectional Encoder Representations from Transformers model.

15. A computer system to automatically summarize a transcript, the computer system comprising:

a processor programmed to:

access a plurality of heuristic rules that encode scoring that adds or subtracts points to process the transcript, the plurality of heuristic rules comprising at least a first heuristic rule and a second heuristic rule, wherein the transcript is transcribed from audio having spoken words or phrases relating to a subject matter domain;

generate a plurality of segments based on content of the transcript, each segment comprising a respective portion of the content;

for each segment of the plurality of segments:

(i) evaluate the first heuristic rule from among the plurality of heuristic rules against the segment to add or subtract points based on a first characteristic of the segment, (ii) evaluate the second heuristic rule from among the plurality of heuristic rules against the segment to add or subtract points based on a second characteristic of the segment different than the first characteristic, (iii) generate a cumulative segment score for the segment based on the evaluation; and (iv) determine whether to include or exclude the segment based on the cumulative segment score;

identify a subset of the plurality of segments based on the determinations of whether to include or exclude the segments determined at (iv); and generate a summary of the transcript based on the subset of the plurality of segments.

16. The computer system of claim 15, wherein the plurality of heuristic rules comprises a first rule to adjust the cumulative segment score based on one or more of a plurality of features of the segment, wherein to evaluate the plurality of heuristic rules, the processor is further programmed to:

assess a plurality of features with respect to the segment, wherein the cumulative segment score is generated based on the assessment.

17. The computer system of claim 16, wherein the plurality of features comprises one or more of: (1) a number of disconnected digit sequences in a given segment, (2) a number of characters of the given segment, (3) whether or not the segment includes a percent symbol, (4) whether or not the segment includes a currency word or symbol, (5) a sentiment of the given segment, (6) a number of matches from a set of financial lexicons, (7) a number of capitalized tokens, (8) a number of fluff phrases that match in the given segment, or (9) a distance from a beginning of the content of the transcript.

18. The computer system of claim 16, wherein each segment comprises a sentence, and the plurality of heuristic rules comprise a second rule to increase the cumulative segment score when a number of characters in the sentence exceeds a threshold number of characters.

19. The computer system of claim 16, wherein the plurality of heuristic rules comprise a second rule to increase the cumulative segment score when the segment includes a match in a set of financial lexicons.

20. The computer system of claim 16, wherein the plurality of heuristic rules comprise a second rule to decrease the cumulative segment score when the segment includes a fluff phrase deemed to be unimportant to the transcript.

* * * * *